United States Patent [19]
Rohrberg

[11] Patent Number: 5,531,370
[45] Date of Patent: Jul. 2, 1996

[54] HIGH-PRECISION SIZING, CUTTING AND WELDING TOOL SYSTEM FOR SPECIALTY AEROSPACE ALLOYS

[76] Inventor: Roderick G. Rohrberg, 2742 W. 234th St., Torrance, Calif. 90505

[21] Appl. No.: 90,392

[22] Filed: Jul. 9, 1993

Related U.S. Application Data

[63] Continuation-in-part of Ser. No. 762,713, Sep. 19, 1991, abandoned, which is a continuation-in-part of Ser. No. 567,951, Aug. 14, 1990, abandoned.

[51] Int. Cl.⁶ .................................................. B21D 39/04
[52] U.S. Cl. .......................................... 228/173.4; 72/126
[58] Field of Search ..................................... 72/78, 84, 95, 72/96, 100, 122, 125, 126, 123; 228/173.4

[56] References Cited

U.S. PATENT DOCUMENTS

| | | |
|---|---|---|
| 1,543,583 | 6/1925 | Mason . |
| 1,732,861 | 10/1929 | Rosenbloom . |
| 2,388,643 | 11/1945 | Rode et al. . |
| 3,016,856 | 1/1962 | Cummings ............................ 72/393 |
| 3,498,245 | 3/1970 | Hansson . |
| 3,811,306 | 5/1974 | Yoshimura . |
| 4,402,202 | 9/1983 | Gombas . |
| 4,689,863 | 9/1987 | Weber et al. ............................ 72/123 |

OTHER PUBLICATIONS

"Top Notch threading and grooving toolholders" (undated).

*Primary Examiner*—Lowell A. Larson
*Attorney, Agent, or Firm*—Anglin & Giaccherini

[57] ABSTRACT

The present invention solves the problems encountered by conventional machine tool devices when specialty metals such as titanium, Inconel™ and stainless steel are sized, cut or welded. The Sizing Tool is capable of precisely and permanently changing the shape of a tubular workpiece because, unlike conventional static spreaders, it repeatedly bends the workpiece back and forth many times to achieve the desired deformation. The Sizing Tool includes a set of revolving rollers (14) supported by bearings (13) and a mounting plate (12). The roller (14) is capable of engaging either the inside or outside surface of a hollow metal tube (10). The rollers (14) exert force on the end of the tube (10) having a circular cross-section in a configuration that resembles a polygon inscribed in a circle. As the rollers (14) are moved toward the workpiece (10), the workpiece is gradually deformed as it moves farther into the inclined surface presented by each roller (14). The dynamic flexure flaring method provided by the present invention enables a technician to work harden and produce precisely formed surfaces within a tolerance of one-thousandth of an inch which can be relied upon to maintain their shape over long periods of time. The Cutting Tool is controlled by an innovative tool advance assembly that converts translational motion to precise radial motion which governs the action of the cutting bit as it severs a tubular workpiece (10). The Cutting Tool is not only capable of cutting a tubular workpiece (10) from the inside out, but can also be configured to cut a tube (10) from the outside.

5 Claims, 34 Drawing Sheets

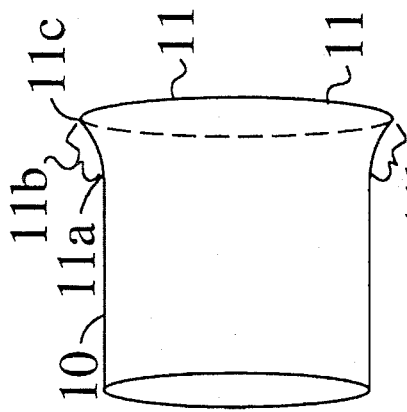
Fig. 2L
Fig. 2M
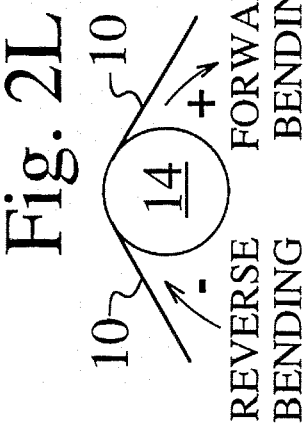

Fig. 2D
Fig. 2E
Fig. 2F
Fig. 2G

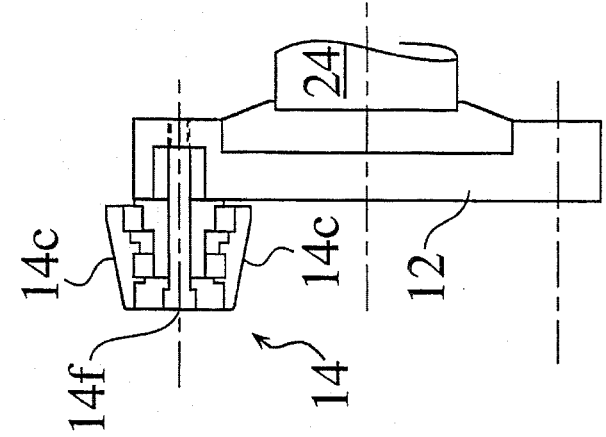
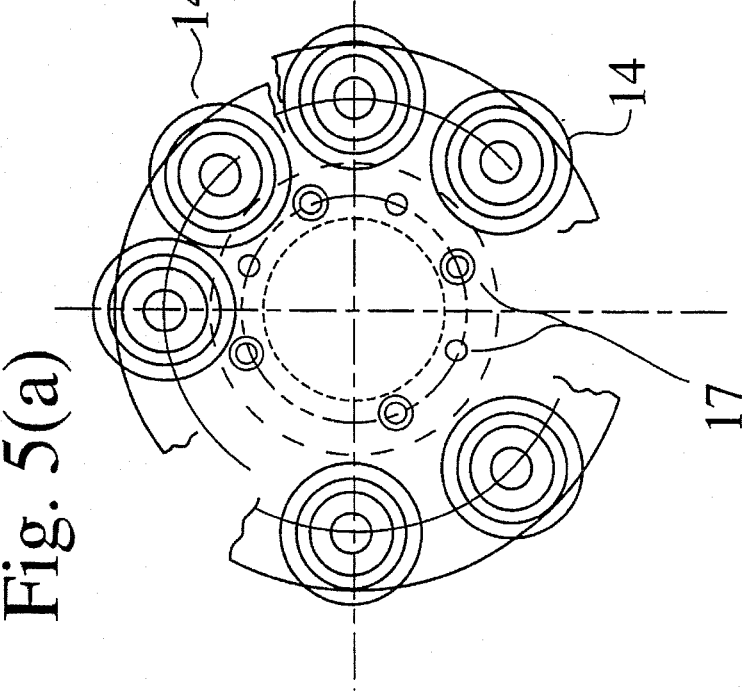
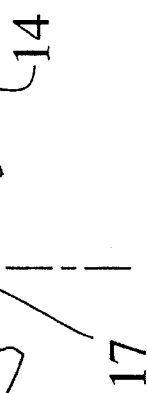
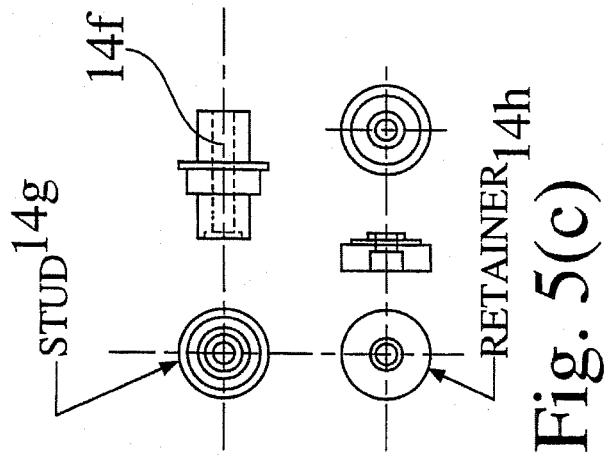

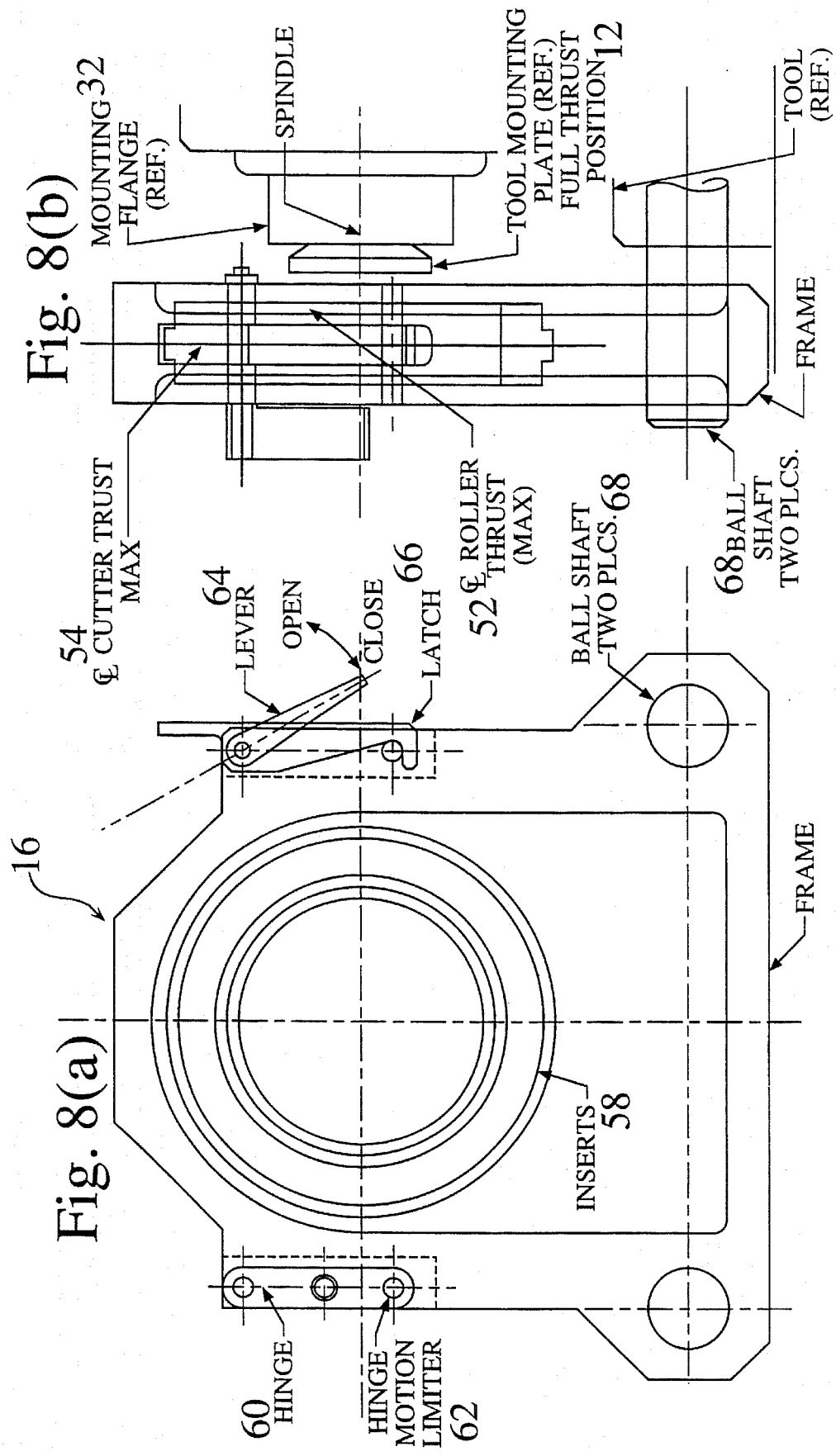

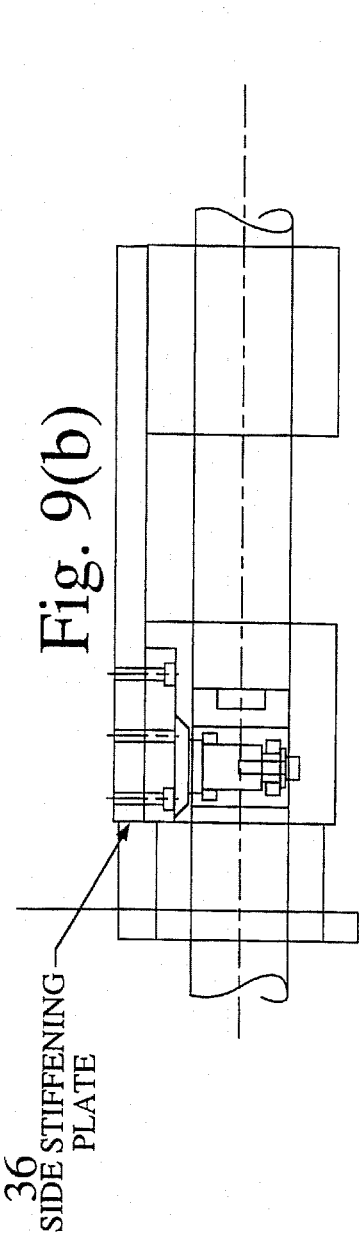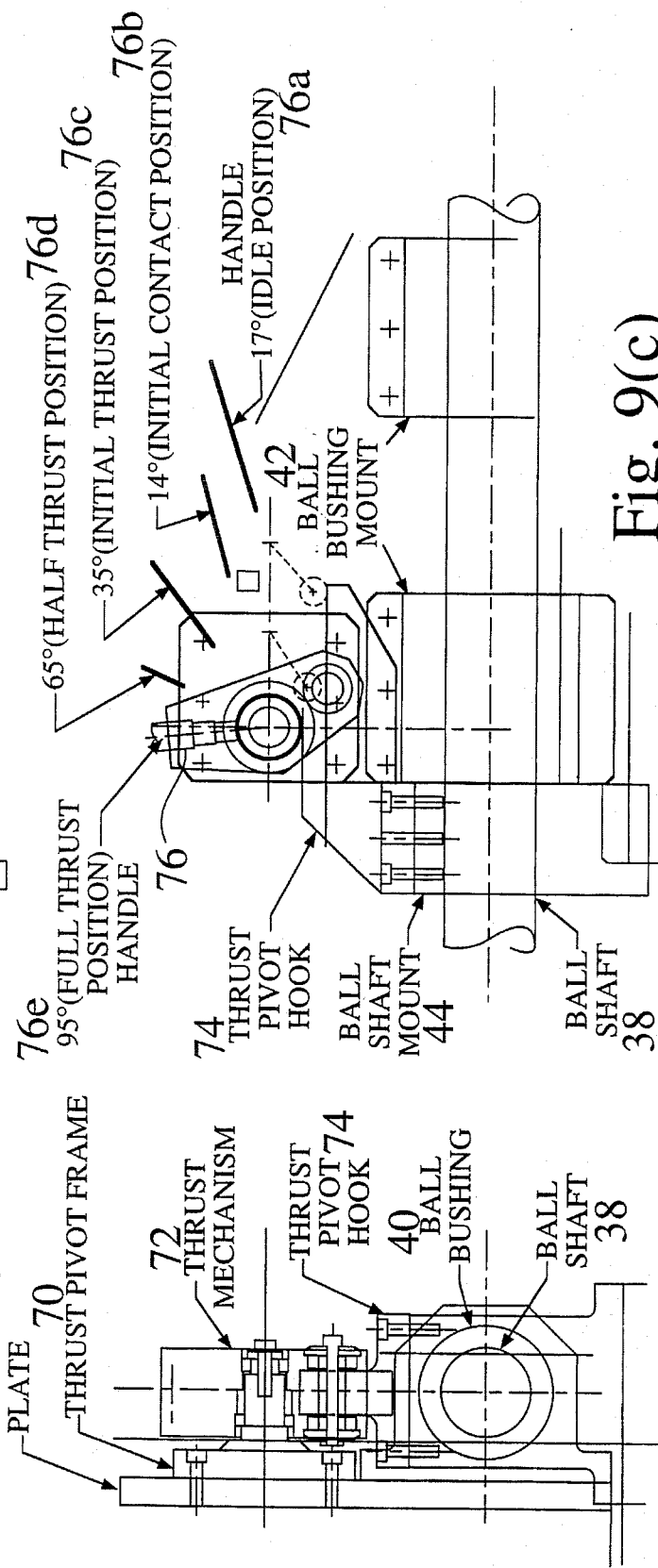

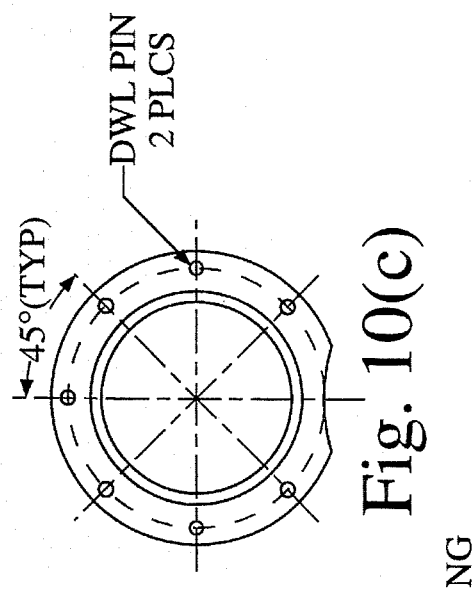
Fig. 10(a)
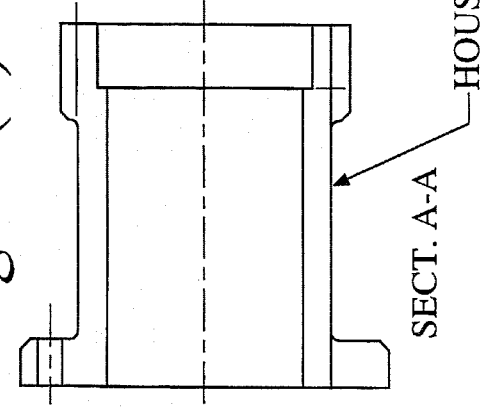
Fig. 10(b)
Fig. 10(c)
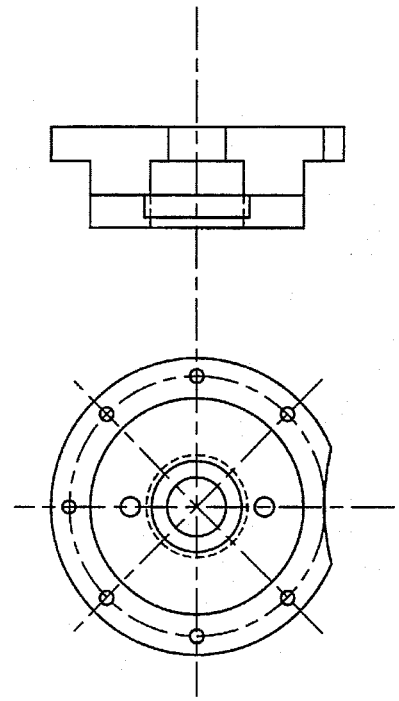
Fig. 10(e)
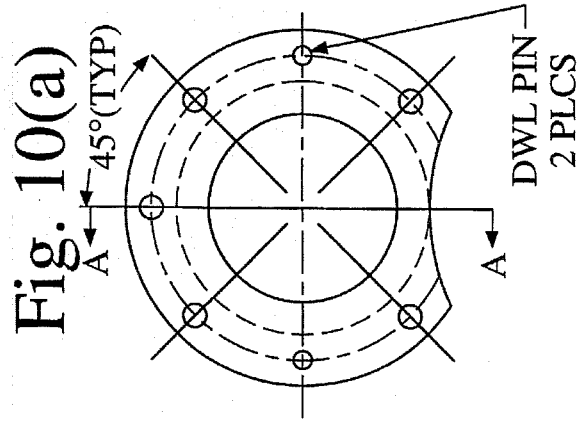
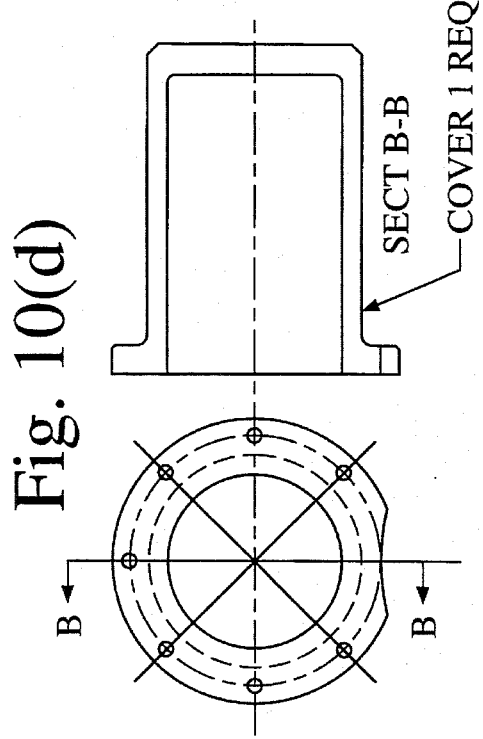
Fig. 10(d)

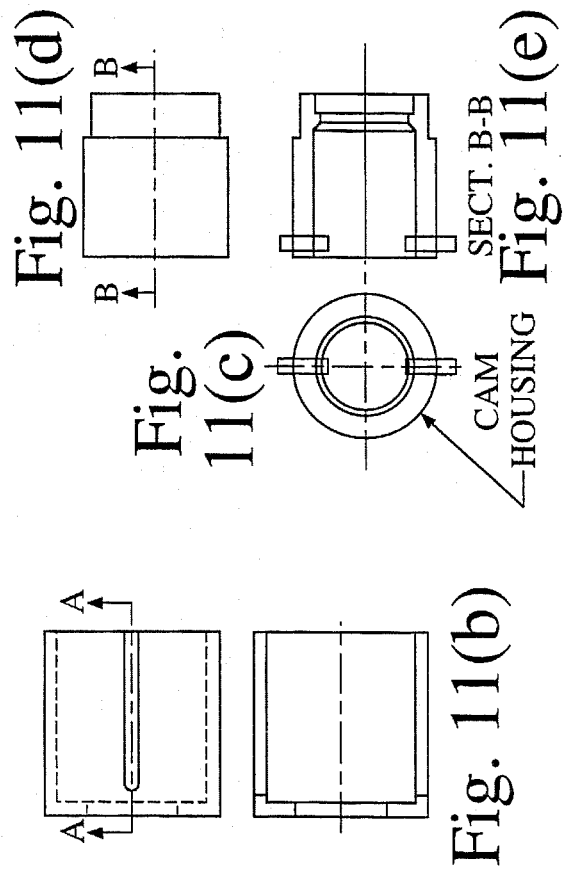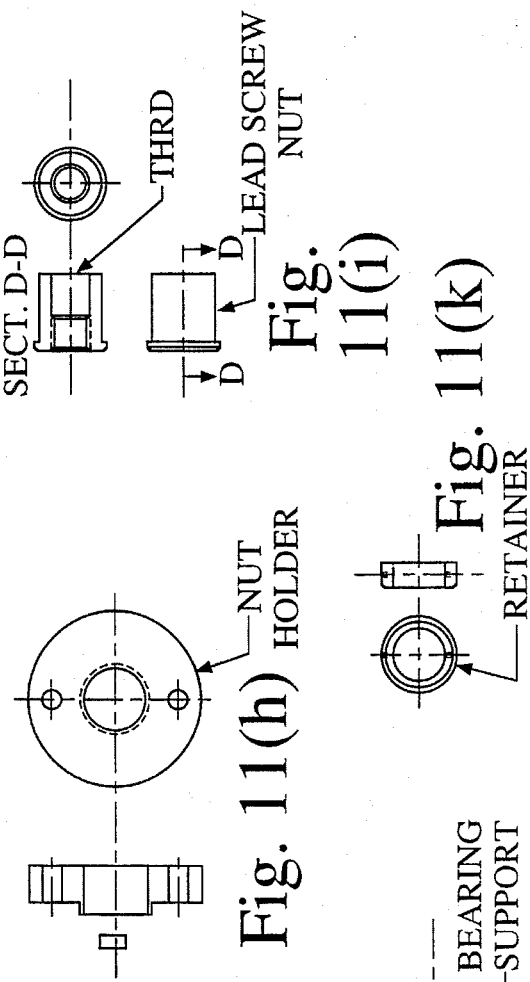

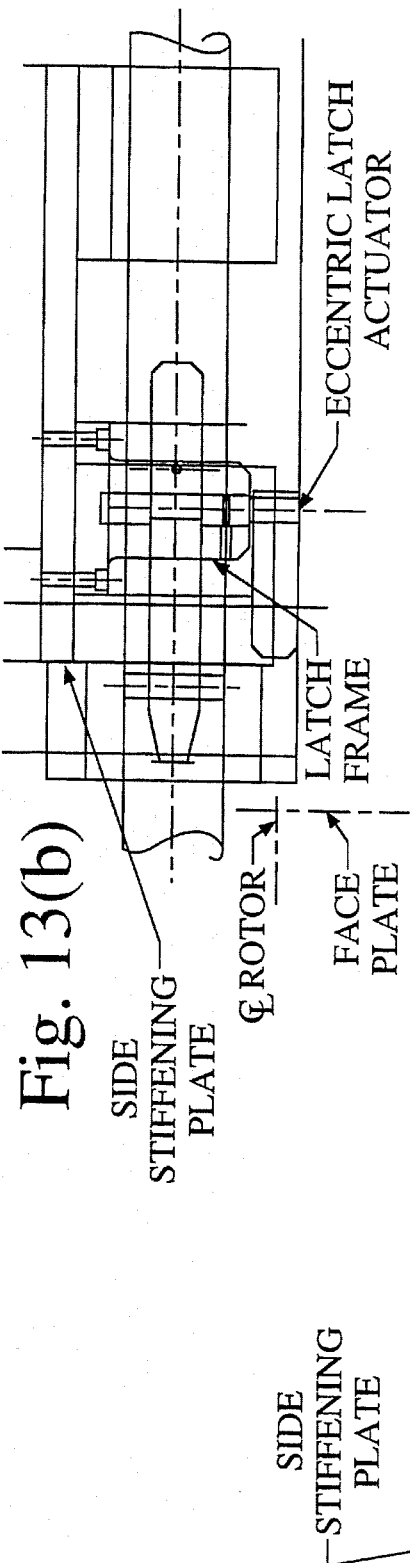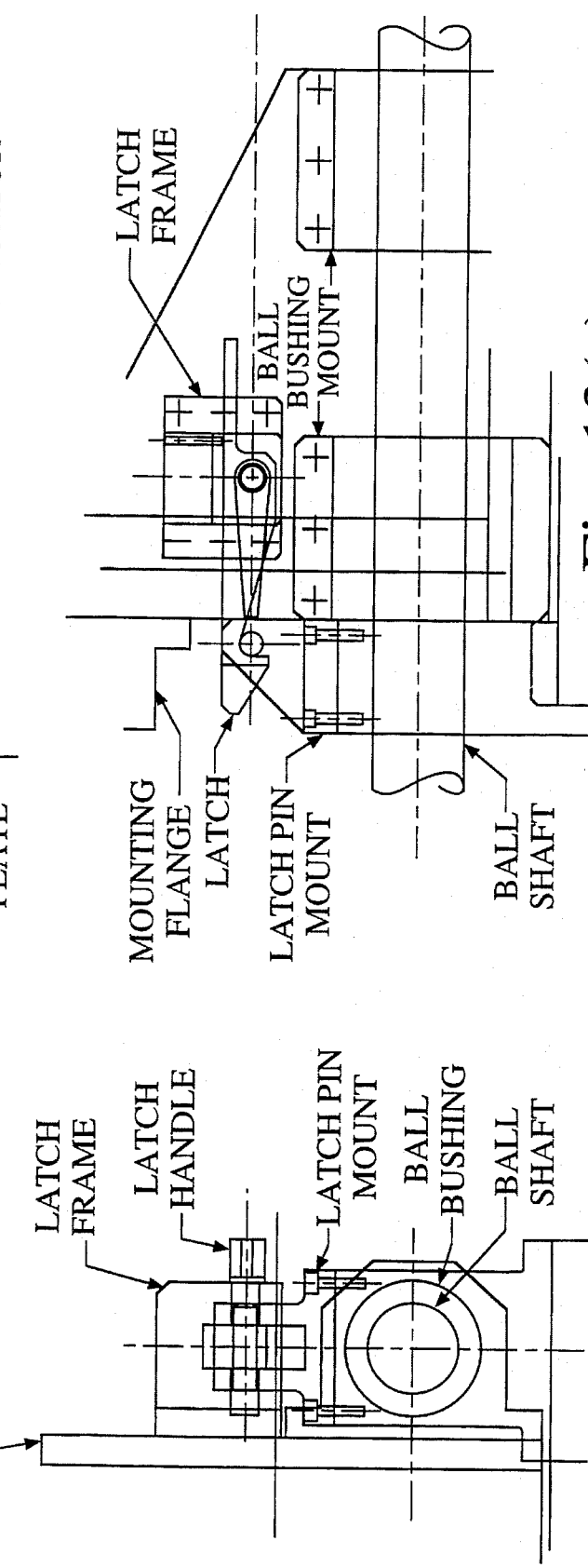
Fig. 13(a), Fig. 13(b), Fig. 13(c)

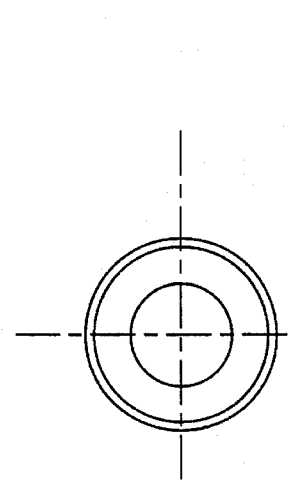
Fig. 14(c)
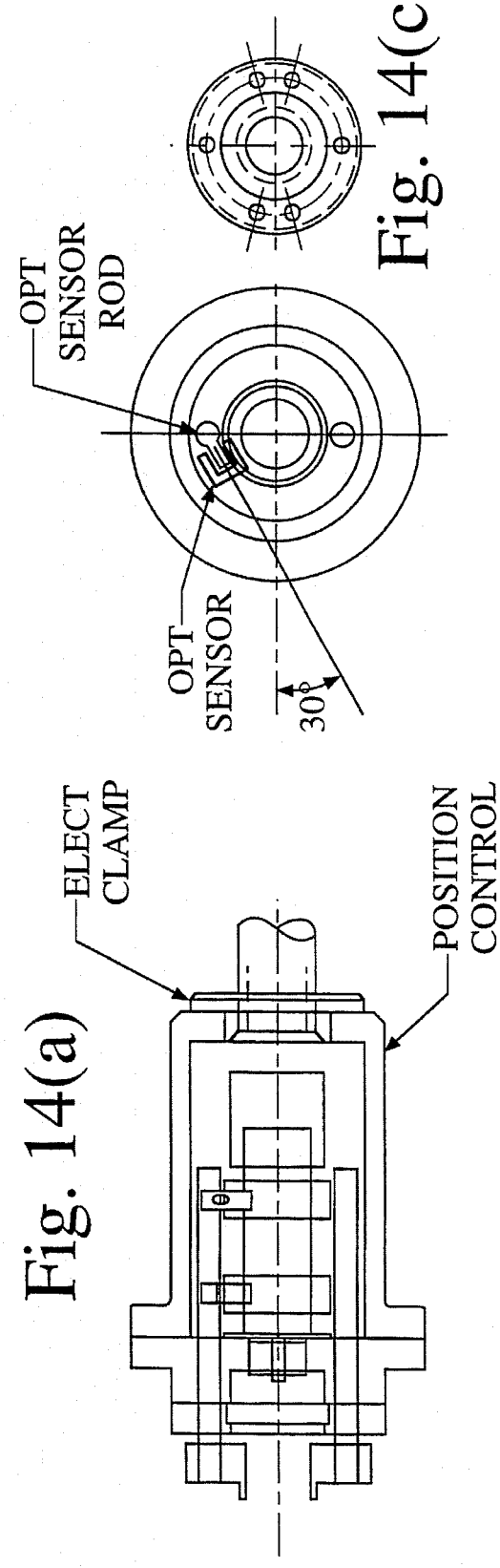
Fig. 14(b)
Fig. 14(a)
Fig. 14(f)
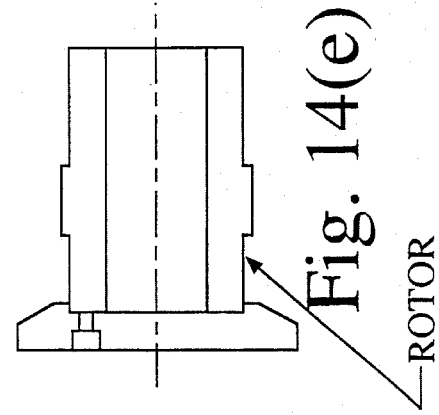
Fig. 14(e)
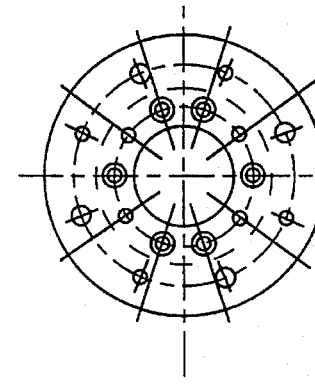
Fig. 14(d)

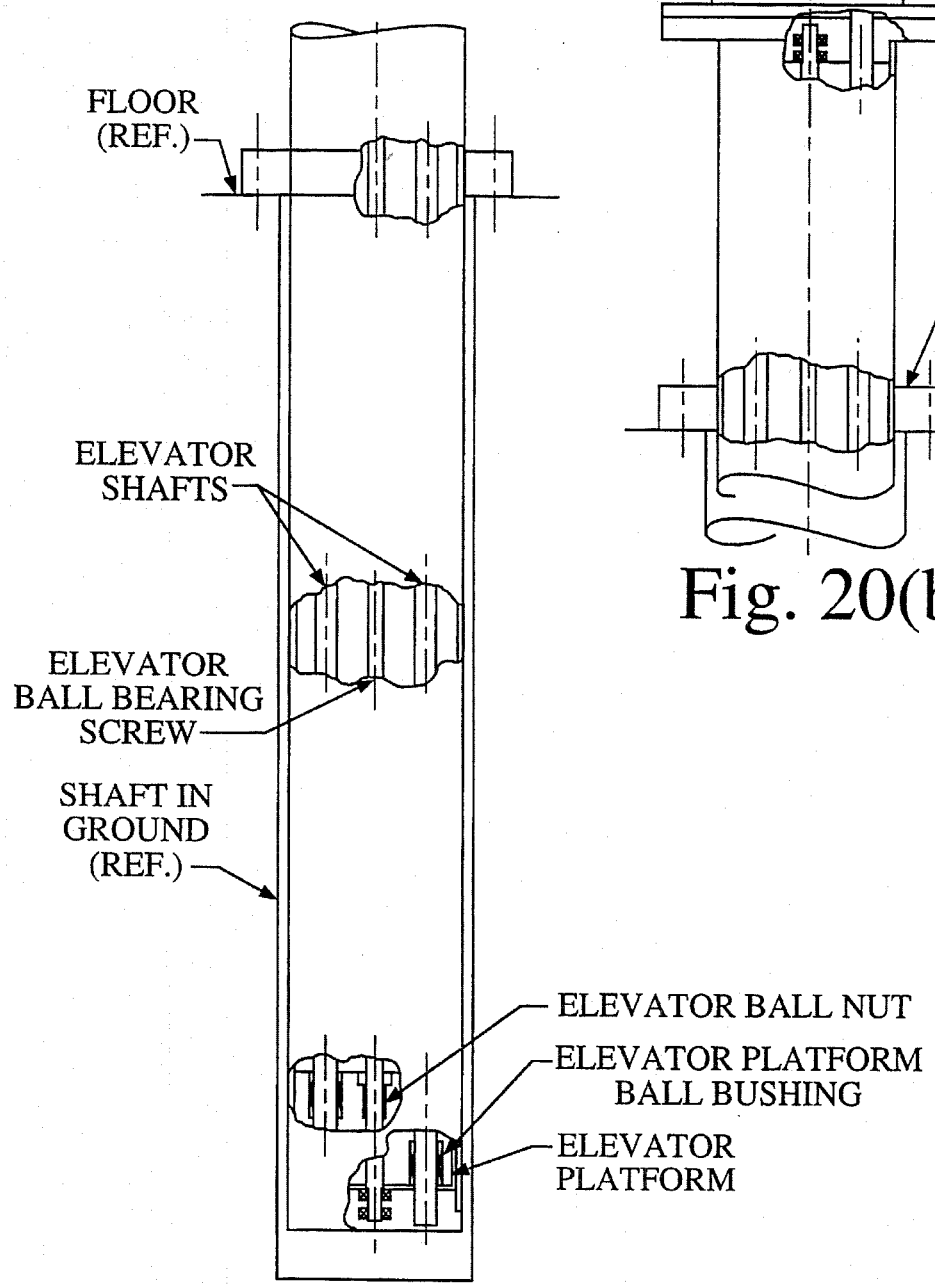

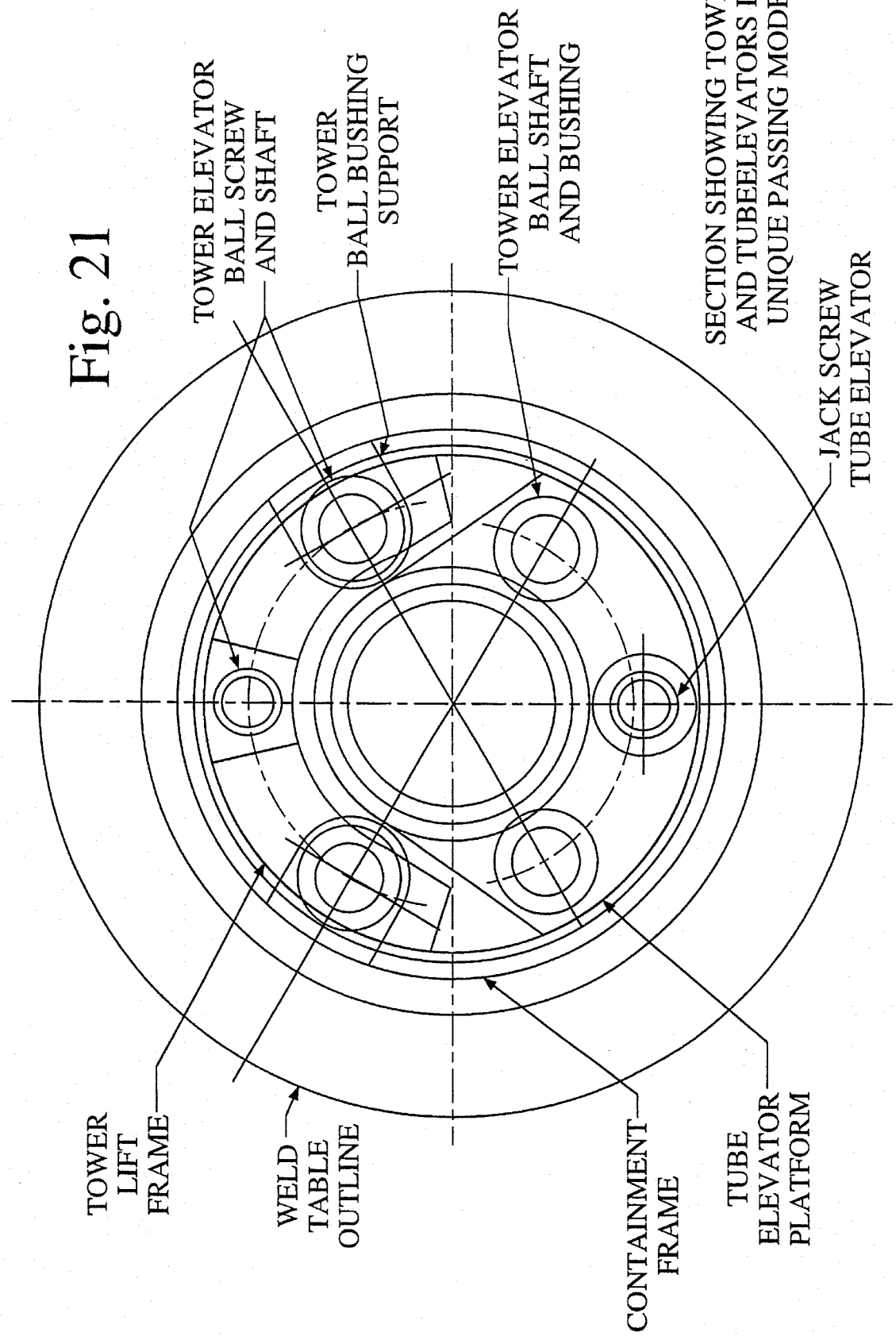

Structural Classes of Commercial Titanium Based Alloys [Woo72][Str82]

| Alloy | Classification |
|---|---|
| Ti-5Al-2.5Sn | α |
| Ti-8Al-1Mo-1V | near-α* ⎫ |
| Ti-6Al-2Sn-4Zr-2Mo | ⎭ |
| Ti-6Al-4V | |
| Ti-6Al-2Sn-6V | α + β |
| Ti-3Al-2.5V | |
| Ti-6Al-2Sn-4Zr-6Mo | near-β ⎫ |
| Ti-5Al-2Sn-2Zr-4Cr-4Mo | |
| Ti-3Al-10V-2Fe | ⎭ |
| Ti-13V-11Cr-3Al | |
| Ti-15V-3Cr-3Al-3Sn | |
| Ti-4Mo-8V-6Cr-4Zr-3Al | β |
| Ti-8Mo-8V-2Fe-3Al** | |
| Ti-11.5Mo-6Zr-4.5Sn | |

\* The terms "lean-β" and "super-α" may also be used.
\*\* Obsolete alloy.

Fig. 30

HIGH-PRECISION SIZING, CUTTING AND WELDING TOOL SYSTEM FOR SPECIALTY AEROSPACE ALLOYS

CROSS REFERENCE TO RELATED PATENT APPLICATIONS AND CLAIM FOR PRIORITY

The present patent application is a Continuation-in-Part application based on a commonly-owned application entitled "High-Precision Sizing, Cutting, and Welding Tool System," which was filed on Sep. 19, 1991 and which was assigned U.S. patent application Ser. No. 07/762,713, now abandoned. U.S. patent application Ser. No. 07/762,713 is itself a Continuation-in-Part patent application based on a commonly-owned parent application entitled "High-Precision Sizing Tool System" which was filed on Aug. 14, 1990, which was assigned U.S. Ser. No. 07/567,951 and which is now abandoned. The Applicant hereby claims the benefit of priority of both filing dates for any and all subject matter disclosed in these two previous and the present patent applications.

BACKGROUND OF THE INVENTION

The present invention includes methods and apparatus for sizing, cutting and welding a variety of metal workpieces fabricated from specialty alloys, such as titanium, Inconel™, or hybrid stainless steels. More particularly, the High-Precision Sizing, Cutting and Welding Tool System for Specialty Aerospace Alloys is a versatile and highly effective machine tool that is capable of forming meticulously accurate flared surfaces, and is also capable of precisely severing and welding these alloy tubes.

The aerospace industry in the United States is rapidly being confronted with obsolete fabrication technology and equipment that cannot keep pace with the technological requirements of today's and tomorrow's aircraft requirements. Each year the machine tool industry encounters new demands of engineers who specify increasingly complex machining processes for the manufacture of metal parts. One of greatest challenges confronting designers in the precision welding industry is finding more precise and dependable techniques to join metal parts that may have exceedingly small dimensional tolerances or that may be fabricated from exotic alloys, such as titanium, Inconel™, or hybrid stainless steels. The aircraft and aerospace industries are constantly confronted by difficulties that arise when hollow cylindrical metal conduits are welded together. These tubes reside within the fuselage or wings of an aircraft and are used to convey fluids or to protect environmental control systems within the vehicle.

Although the existence of titanium was first observed in 1790, a feasible process of producing titanium was not discovered until 1938. Titanium sponge was first developed by W. J. Kroll and was produced using the magnesium reduction of titanium tetrachloride. Shortly thereafter, the United States armed services became interested in titanium because of its high melting point. The first commercial titanium became available around 1950, and the production and use of titanium alloys has increased steadily since that time.

Titanium and its alloys have material properties that make it especially desirable for special applications, particularly within the aerospace industry. First, titanium has a high strength-to-weight ratio, which makes it comparable to many steels and stainless steels, while being only about 56 percent as heavy. While titanium alloys are about 40 percent heavier than aluminum, their greater strength allows much less material to be used for many applications. Titanium alloys also possess good corrosion resistance, and high heat performance which makes them even more desirable for aerospace applications.

Despite the desirable properties that titanium alloys possess, the high cost of the material and difficulties with production and fabrication with titanium alloys have limited their widespread use. Titanium alloys tend to be very unforgiving when standard fabrication methods are employed. They are at least as difficult to work with as hybrid stainless steel alloys. Titanium alloys are also easily contaminated at high temperatures, which can seriously impact the quality of a weld joint in a titanium structure. New techniques would be needed to prepare and weld titanium alloy structures that avoid such contamination and minimize the requirement of additional weld metal.

The basic method of mating metal tubes end-to-end is commonly referred to as "butt welding," and is well known to persons ordinarily skilled in the welding art. The tubes are usually placed in a jig or fixture, aligned, and then welded together using a conventional weldhead. If the dimensions of the two tubes are not precisely matched, conventional "spreader" fixtures, such as that shown in FIG. 1, may be used to try to correct any dimensional mismatch and minimize the differences between the dimensions of the two mating components. This spreader fixture known as a "pie-die", labeled "A" in FIG. 1, includes four sections B, C, D, and E which operate simultaneously and are arranged in a circular pattern about a central point F. All of the sections, which resemble the slices of a pie cut into quarters, move radially away from center point F. The entire device A is placed inside a hollow tube which requires shaping, and then one or more sections B, C, D, or E is forced outward against the workpiece. In FIG. 1, the primed reference numerals B', C', D', and E' indicate the displaced positions of each of the shaping sections. This technique, however, is very limited because the workpiece nearly always has a tendency to spring back to its original position after it is stretched by the "pie-die" spreader. Overcoming this elastic memory or "springback" effect is difficult to accomplish using a non-rotating sectioned spreading device. This conventional method is usually imprecise and may lead to faulty welds that can ultimately crack and break apart.

Previous mechanical devices have employed roller mechanisms to work thin gauge tin, copper, or steel sheet metal to quickly deform these common metals for simple fabricated objects, such as cans, drums, or tube sheets. In U.S. Pat. No. 1,732,861, issued on Oct. 22, 1929, Rosenbloom discloses a simple tool that uses rollers to form flanges out of holes in sheet metal plates, such as tank or drum tops. This device was designed to be operated with a simple drill press. In U.S. Pat. No. 1,543,583, issued on Jun. 23, 1925, Mason discloses a tool that uses a roller mechanism to bell tubes in boilers during the manufacturing process. In U.S. Pat. No. 2,388,643, issued on Nov. 6, 1945, Rode et al. used an apparatus employing swaging dies to taper or swage the outer surface of common seamless tubing. In U.S. Pat. No. 3,811,306, issued on May 21, 1974, Yoshimura discloses a method and apparatus for forming and deburring a cylindrical can fabricated from aluminum or tin plate, which employed rollers to the outside surface of the workpiece.

In U.S. Pat. No. 3,498,245, issued on Mar. 3, 1970, Hansson discloses a roller sizing tool for forming can bodies by working the relatively brittle sheet metal beyond its elastic limit. The Hansson reference discloses rollers (53)

that protrude from shanks (54) which pass through bores (56) in a body (46) which contains a complex ball bearing retainer (60, 61, 62, 63 and 64) for each roller (53). A reduced threaded end portion (55) extends from each shank (54) past a washer (58), and is fastened on the opposite side of the body (46) with a nut (57). The rollers (53) are "journalled in the disk-like body 46". (See Hansson, Col. 7, Line 35.) In Hansson's arrangement, the rollers (53), shanks (54) and nuts (57) spin together on an inner ball bearing race (61). Because of the action of the internal ball bearing (60), Hansson's rollers (54) may shift their positions relative to an axis that extends perpendicular to the body (46) when they encounter mechanical resistance presented by the workpiece. This slippage is perfectly acceptable for the process of manufacturing ordinary metal cans, but Hansson's machine is not capable of performing the precise sizing of specialty aerospace alloys which possess high strength-to-weight ratios, good performance at elevated temperatures, and high corrosion resistance.

Hansson's invention was purposely developed for spin flanging of can body edges. (See Hansson, Col. 1, Lines 2–3.) This operation is rough and crude compared to the precise tolerances involved in the processing of specialty alloys in for the aerospace industry. Hansson clearly states that the object of his invention is to increase the transverse ductility of the edges of a high-strength brittle metal can. (See Hansson, Col. 1, Lines 16–17.) Hansson, however, relied on the malleability of his materials which do not experience hardening as they are formed. He was primarily concerned with reducing the stability of his workpiece. The Hansson reference does not provide for easy repair or replacement of the rollers (14).

While past inventors provided mechanisms for the simple, non-critical fabrication of thin gauge common metals, they designed their devices with the intent to utilize the moderate ductility and malleability of the metals they were working with at that time. They never had to consider the difficulties of dealing with the high ductility that is exhibited by many modern high-strength aerospace alloys that are being prepared for precision welding techniques. Aerospace applications often require the precise weldments of titanium tubing of many diameters and gauge sizes, such as 1" diameter tube with a 0.020" wall thickness, or a 6" diameter with a wall thickness of 0.030" to 0.040".

The problem of providing a high-precision sizing, cutting, and welding tool for use with specialty alloys, such as titanium, Inconel™, or hybrid stainless steels, has presented a major challenge to engineers and technicians in the metalworking field. The development of an accurate and versatile system that overcomes the difficulties encountered when conventional welding and metal shaping techniques are employed to fabricate welded titanium, Inconel™, or hybrid stainless steel alloy parts would constitute a major technological advance in the metal fabrication business. The enhanced performance that could be achieved using such an innovative device would satisfy a long felt need within the industry and would enable machine tool equipment manufacturers and users to save substantial expenditures of time and money.

SUMMARY OF THE INVENTION

The High-Precision Sizing, Cutting and Welding Tool System for Specialty Aerospace Alloys disclosed and claimed in this patent application solves the problems encountered by conventional machine tool devices. The spinning Sizing Tool is capable of precisely and permanently changing the shape of a tubular titanium, Inconel™, or hybrid stainless steel workpiece because, unlike conventional static spreaders, it repeatedly bends the workpiece back and forth many times to achieve the desired work hardening and deformation. This technique, which the inventor calls progressive "multiple forward and reverse bending", imposes a permanent flare or other shape on a tube which will overcome the tube's high ductility.

THE SIZING TOOL

The sizing or flaring tool includes a set of revolving rollers supported by bearings and a mounting plate. Although the preferred embodiment of the roller has a tapered work surface, any number of useful configurations may be employed. The roller is capable of engaging either the inside or outside surface of a hollow titanium, Inconel™, or hybrid stainless steel tube. The rollers exert force on the end of a workpiece having a circular cross-section in a configuration that resembles a polygon inscribed in a circle. As the rollers are moved toward the workpiece, the workpiece is gradually deformed as it moves farther into the inclined surface presented by each roller. Each time the rollers make one revolution while in contact with the workpiece, each roller bends every spot on the end of the tube radially outward and then radially inward. The total deflection or deformation of the tube exceeds the elastic modulus of the workpiece so that "springback" is prevented. The dynamic flexure flaring method provided by the present invention enables a technician to produce precisely formed surfaces within a tolerance of one-thousandth of an inch which can be relied upon to maintain their shape over long periods of time. While the preferred embodiment utilizes eight rollers, any number of rollers may be utilized with varied configurations to match the needs presented by a particular workpiece. While the typical workpiece is a hollow metal tube, any number of structural shapes, including those having elliptical and oval cross-sections, may be sized using the present invention. The workpiece can be composed of any titanium, Inconel™, or hybrid stainless steel material which is susceptible to deformation under a gradual and repeated alternating radial force. In an alternative configuration, the workpiece rotates and the Sizing Tool remains stationary.

THE CUTTING TOOL

The Cutting Tool is controlled by an innovative tool advance assembly that converts translational motion to precise radial motion which governs the action of the cutting bit as it severs a tubular titanium, Inconel™, or hybrid stainless steel workpiece. A shaft bearing a revolving cam roller is received by a slot in a tool bit holder that is constrained to move up and down in a radial direction. When the cam roller moves in its circular pathway, the tool bit holder is constrained to move perpendicular to the longitudinal axis of the cam shaft and engages the workpiece that surrounds it. The rotational motion of the cam shaft is, in turn, controlled by the twisting of spiral guidance channels formed in a cup which resides at the opposite end of the cam shaft. These spiral channels are designed to receive a cam pin, which is held in place by a cam housing that surrounds the cam shaft. A second separate guide cup surrounds both the cam housing and the cam shaft located inside the cam housing. When the cam housing moves forward toward the workpiece, the upper portion of the cam pin which it bears is constrained to move only in a straight line parallel to the long axis of the cam shaft by slots formed along the separate guide cup which surrounds the cam housing. The lower portion of the same cam pin extends through the cam housing and engages a spiral channel on the cam shaft. When the cam pin moves, the spiral channels cause the cam shaft to rotate, which forces the cam roller to move in a circular path. The circular motion of the cam roller moves the tool bit up and down along a radial direction. The Cutting Tool is not only capable of cutting a tubular workpiece from the inside out, but can also be configured to cut a tube from the outside.

THE WELDING TOOL

The present invention is a high performance Sizing, Cutting, and Welding Tool System that addresses the troublesome fabrication difficulties posed by conventional metal-working and welding methods. These innovative methods and apparatus provide an effective and efficient means that will enable manufacturers of aviation equipment to create high quality products that will enhance the safety and reliability of a wide variety of aircraft tubular components fabricated from titanium, Inconel™, or hybrid stainless steel.

An appreciation of other aims and objectives of the present invention and a more complete and comprehensive understanding of this invention may be achieved by studying the following description of a preferred embodiment and by referring to the accompanying drawings.

A BRIEF DESCRIPTION OF THE DRAWINGS

FIGS. 2D through 2K are side views of rollers that exhibit illustrative examples of the various work surfaces that may be utilized with the present invention.

FIG. 2L is a schematic diagram of one moving roller impinging upon a workpiece. As the roller rotates in a clockwise direction, all the points along the inner circumference of the hollow cylinder experience repeated alternating forward (+) and reverse (−) bending.

FIG. 2M presents a side view of a sized cylinder that delineates the locations of maximum and minimum deflection due to the dynamic flexure action of the rollers.

Figure 4:
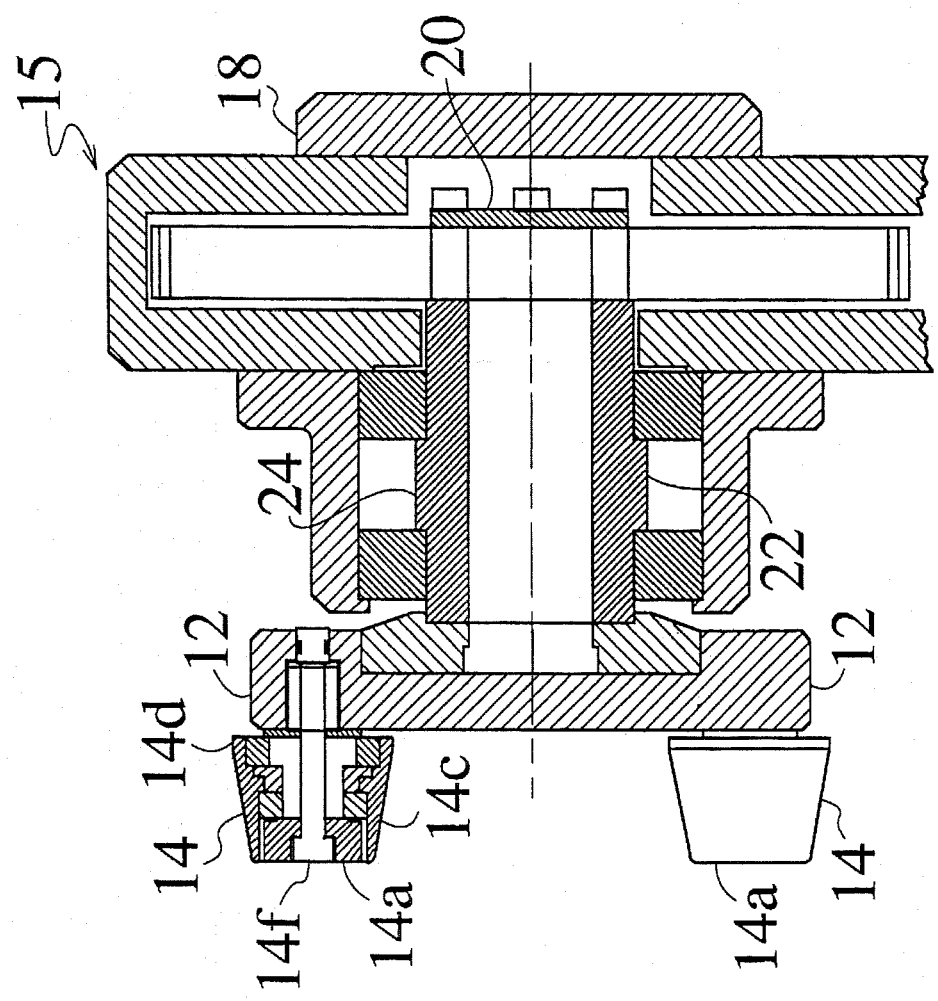
Figure 3:
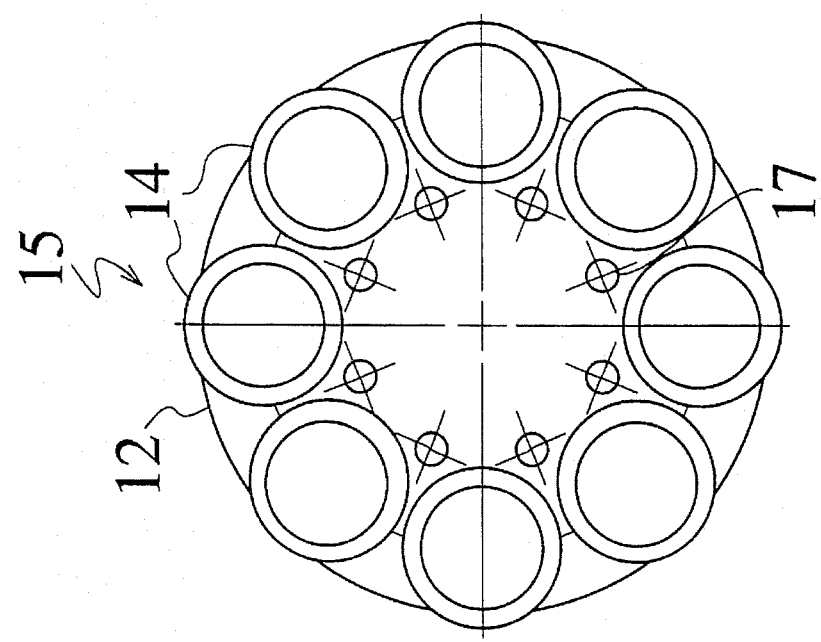

FIGS. 3 and 4 reveal both a partial, side, cross-sectional view of a tool mount assembly coupled to the roller plate and a corresponding front view of eight rollers mounted on a roller plate.

FIGS. 5a, 5b, 5c, and 5d exhibit detailed views of the rollers and roller plate.

Figure 6:
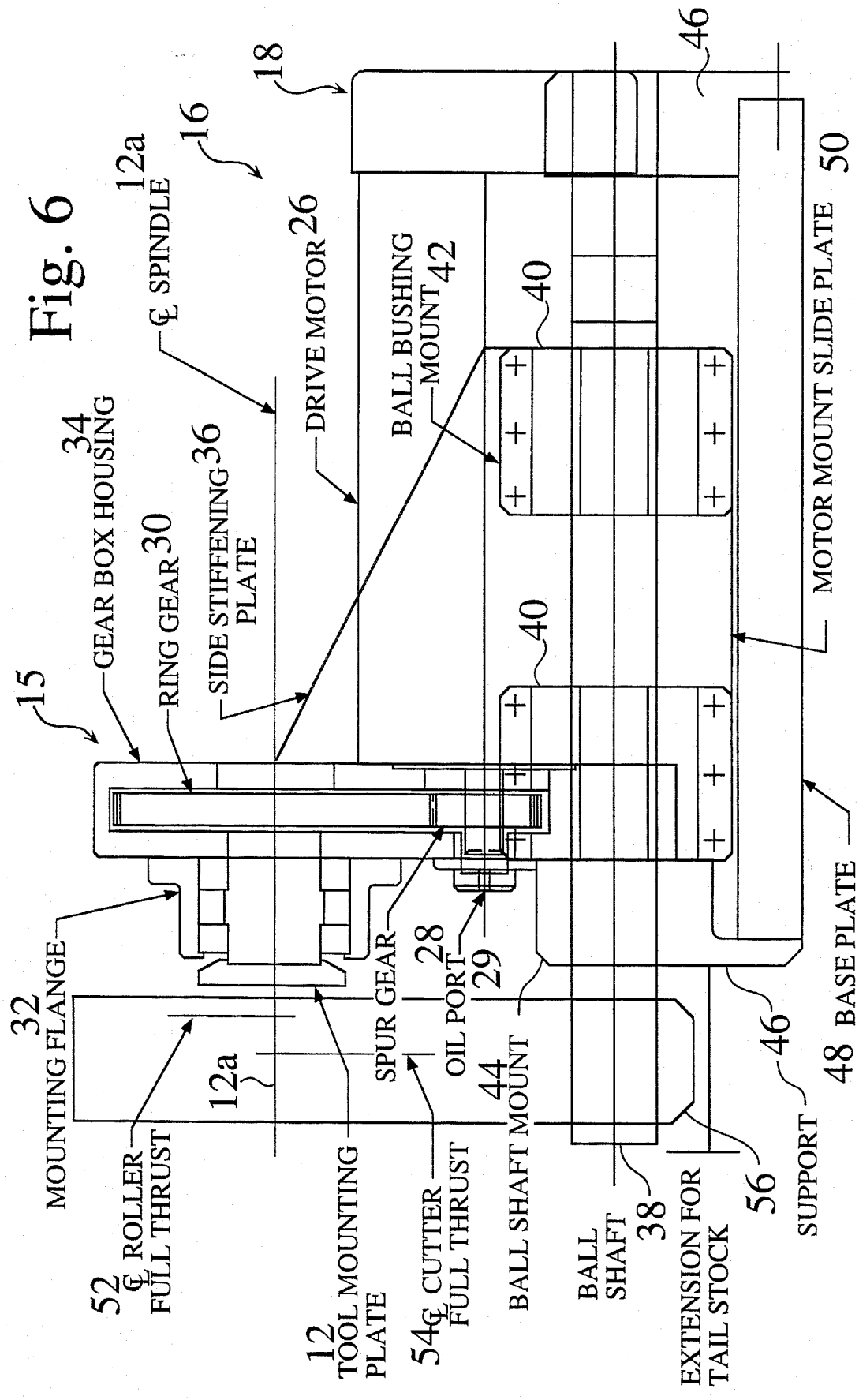

FIG. 6 is a cross-sectional view of the tool mount assembly installed on a motor assembly.

Figure 7:
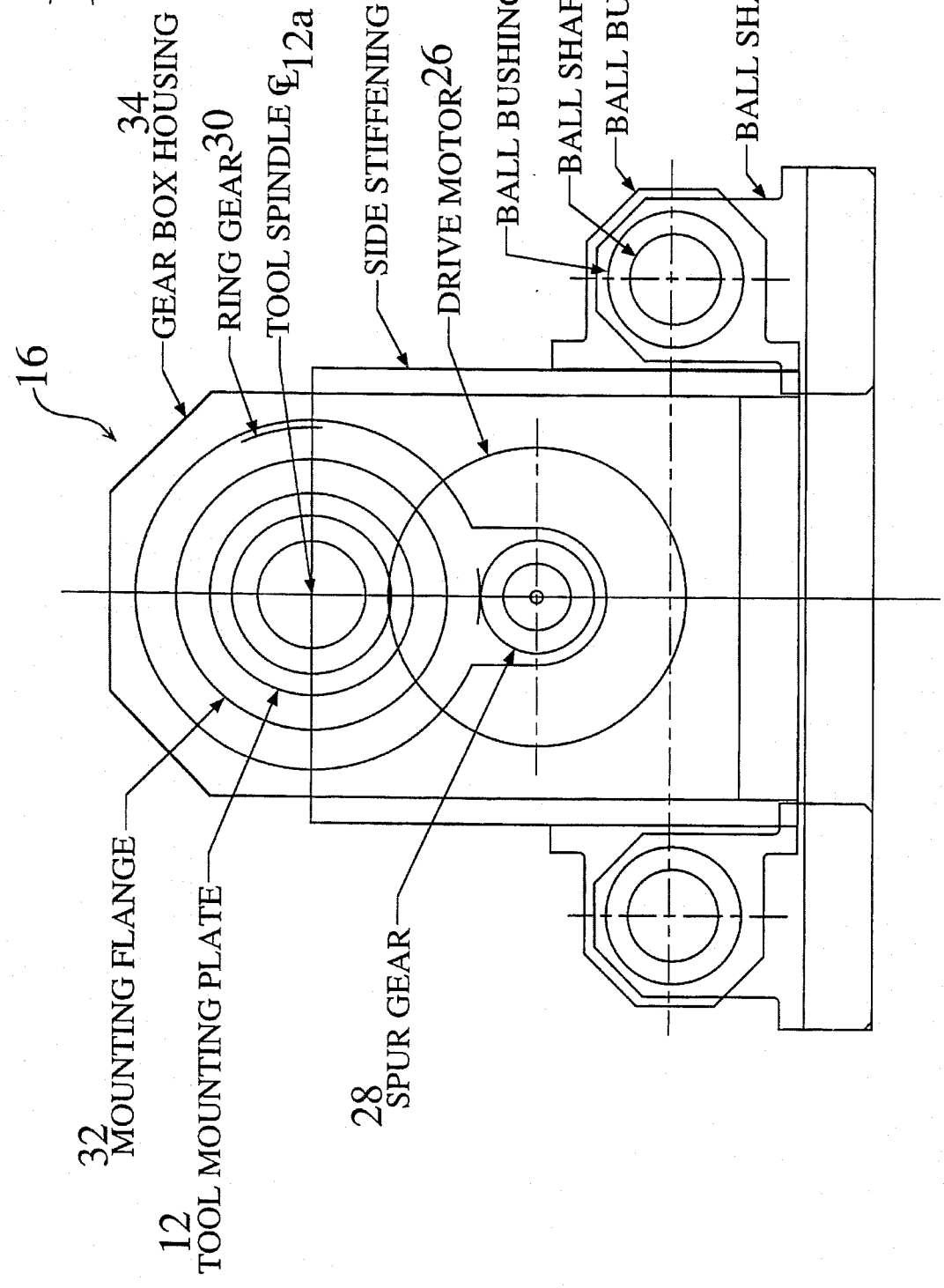

FIG. 7 is a front cross-sectional view of the assembly shown in FIG. 6.

FIGS. 8a and 8b provide front and side views of a workpiece frame.

FIGS. 9a, 9b, and 9c include several views of a Cutting Tool advance mechanism.

FIGS. 10a, 10b, 10c, 10d, and 10e reveal various sectional views of the Cutting Tool housing.

FIGS. 11a, 11b, 11c, 11d, 11e, 11f, 11g, 11h, 11i, 11j, and 11k depict views of components within the Cutting Tool including a housing cam pin guide, a cam housing, a clamp, a lead screw, a nut holder, a lead screw nut, a bearing support, and a retainer.

Figure 12:
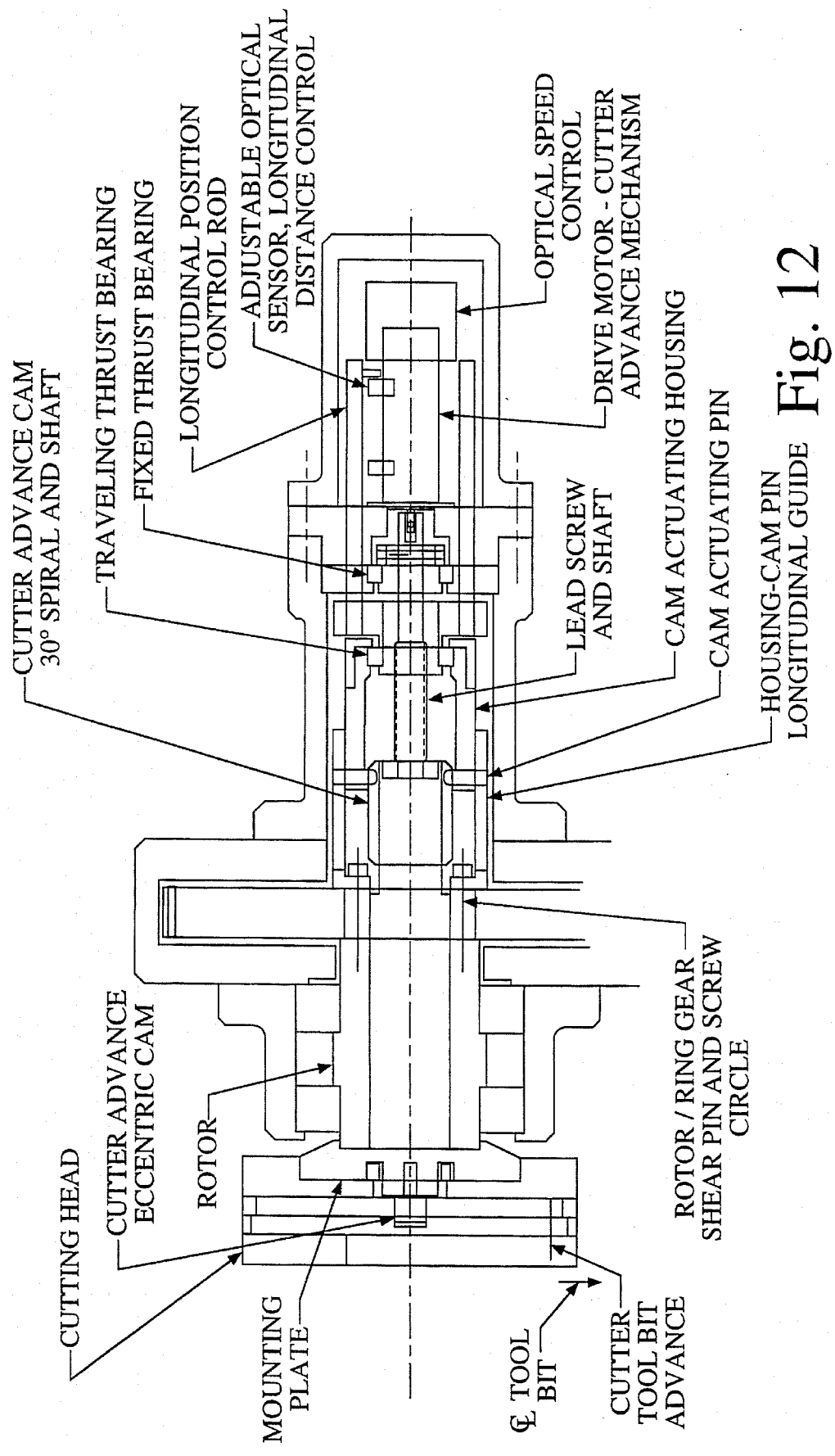

FIG. 12 is a cross-sectional view of a Tool Bit Advance Subassembly.

FIGS. 13a, 13b, and 13c provide various views of a cutter tool latch mechanism, showing a ball shaft, a ball bushing mount, a ball bushing, a latch, a latch frame, a latch handle, and an eccentric latch actuator.

FIG. 14 exhibits a series of views of an optical sensor and electrical clamp rotor. FIG. 14a shows a position control component. FIG. 14b depicts an optical sensor. FIGS. 14c, 14d, 14e, and 14f portray various views of a rotor assembly within the position control component.

Figure 15:
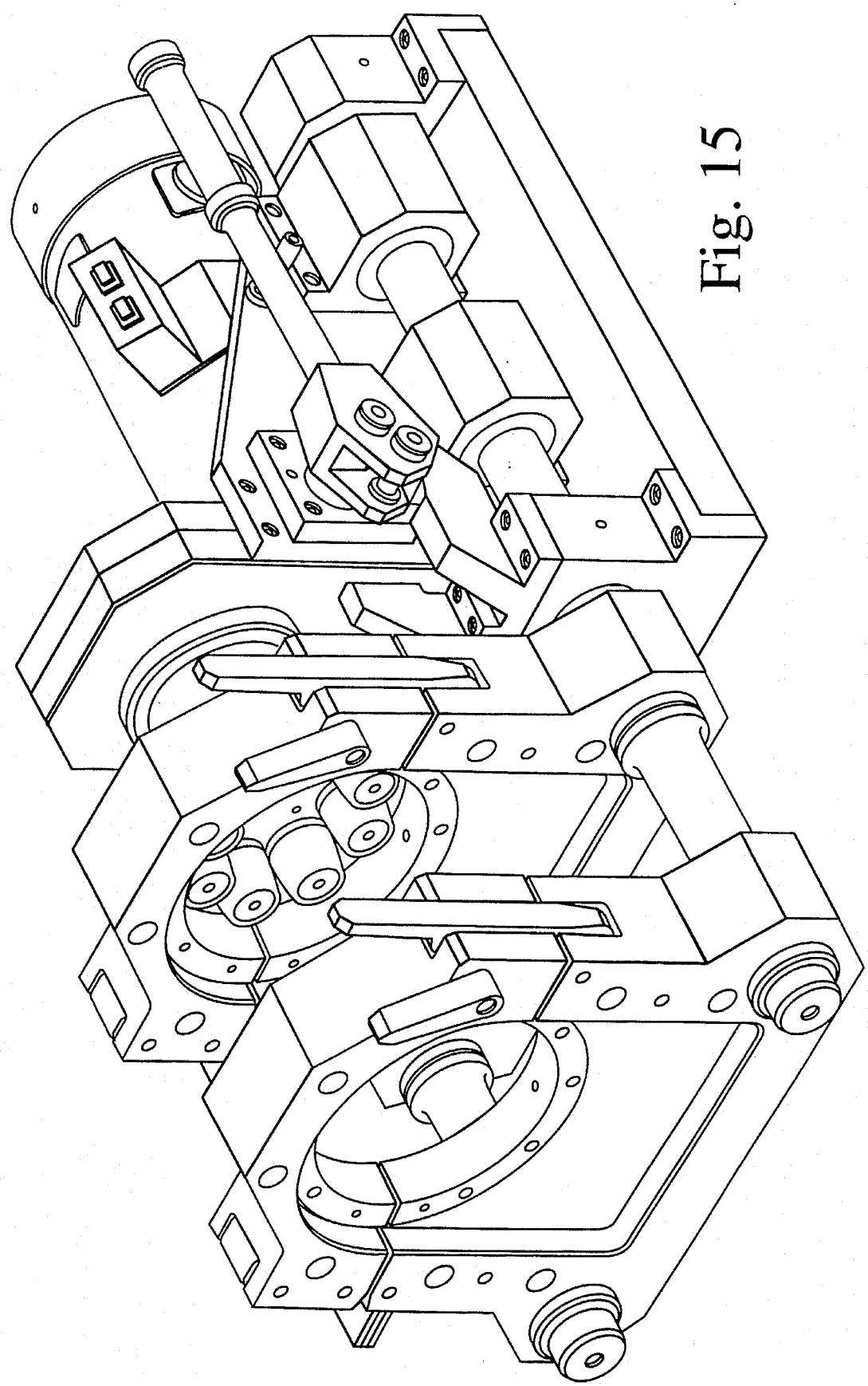

FIG. 15 is a perspective view of the preferred embodiment of the entire Sizing Tool and its associated drive system.

Figure 16:
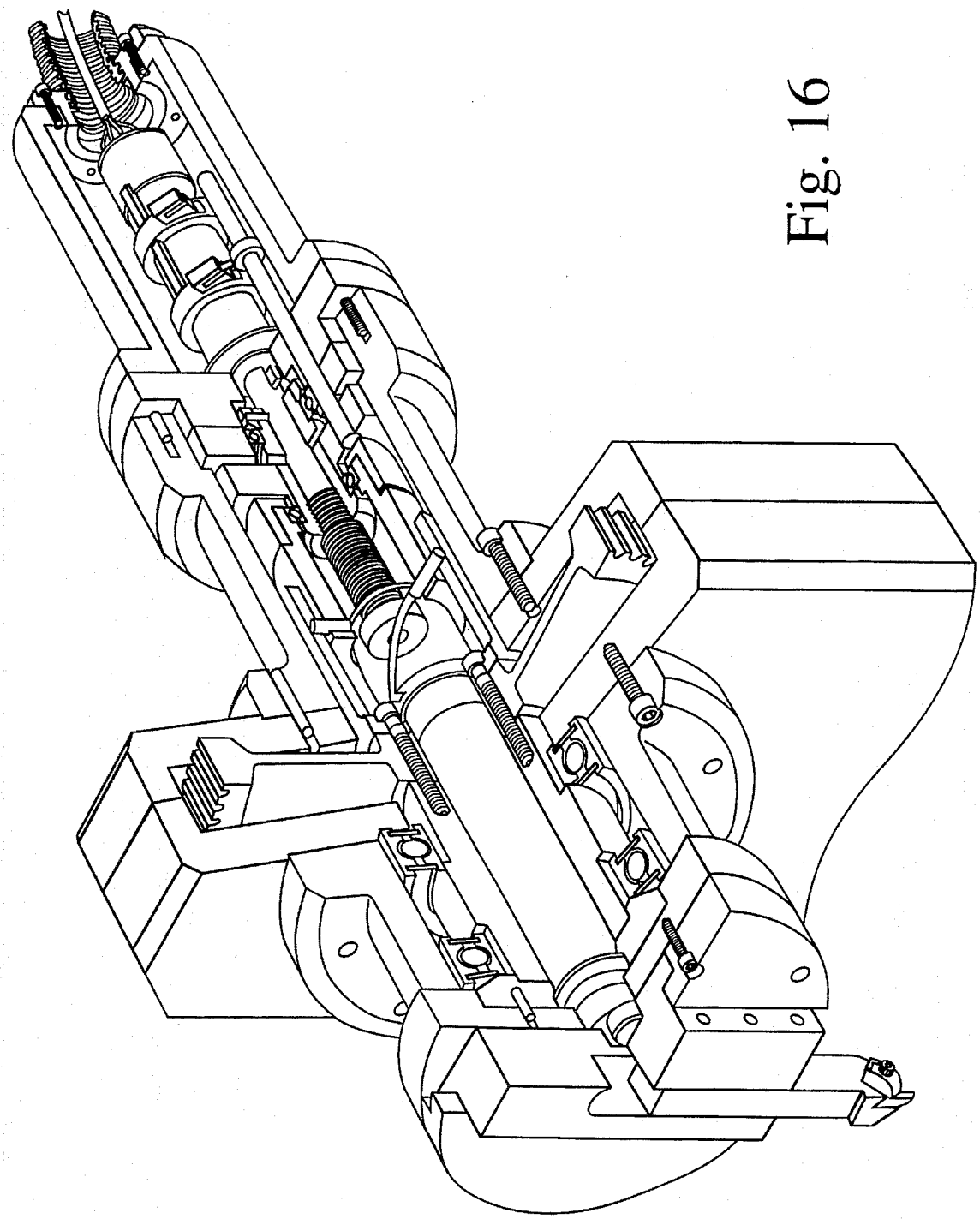

FIG. 16 is a cut-away perspective view of the preferred embodiment of the entire Cutting Tool and its associated drive system.

Figure 17:
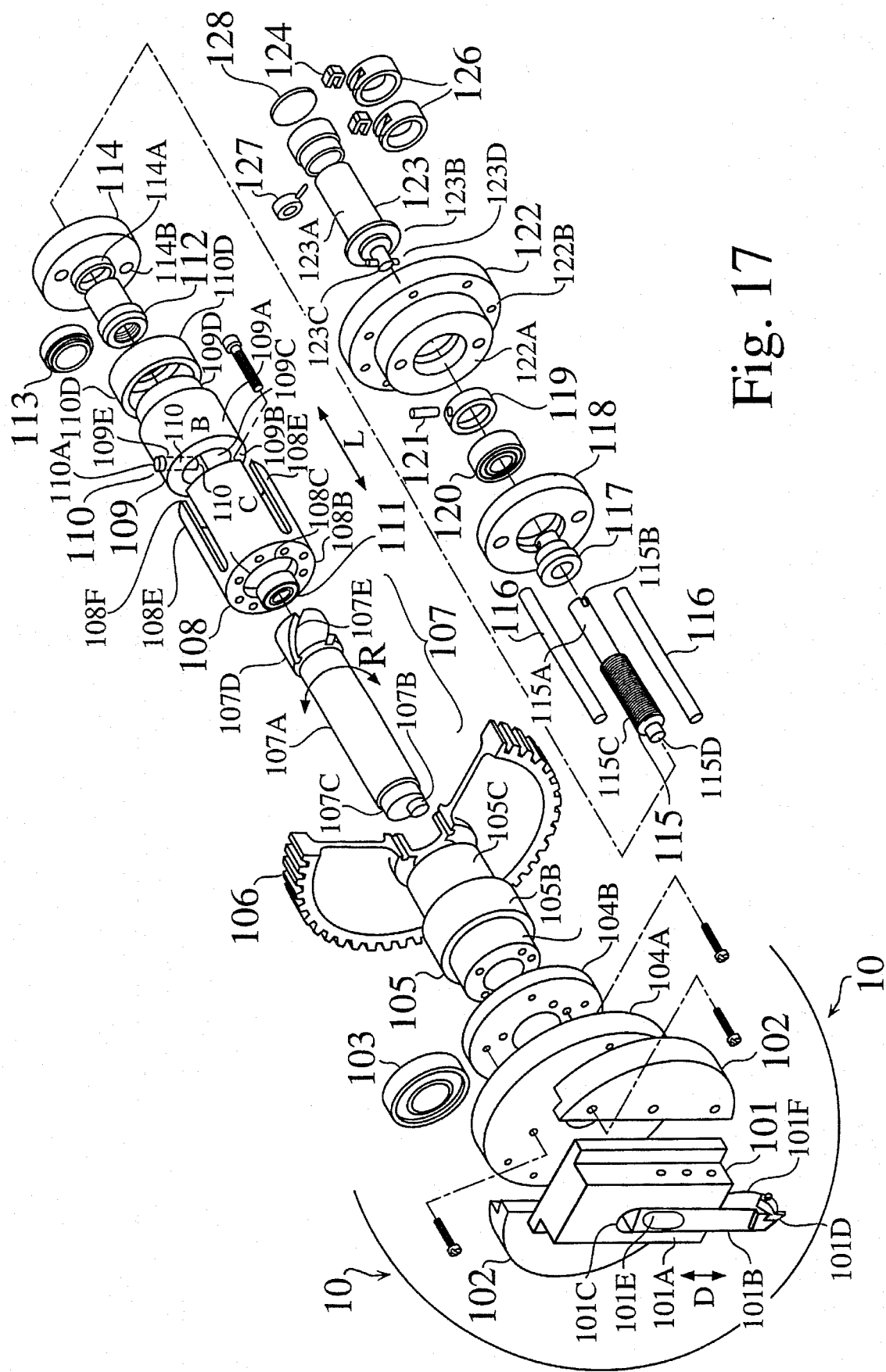

FIG. 17 is an exploded view of the interior components of the preferred embodiment of the Cutting Tool.

Figure 18:
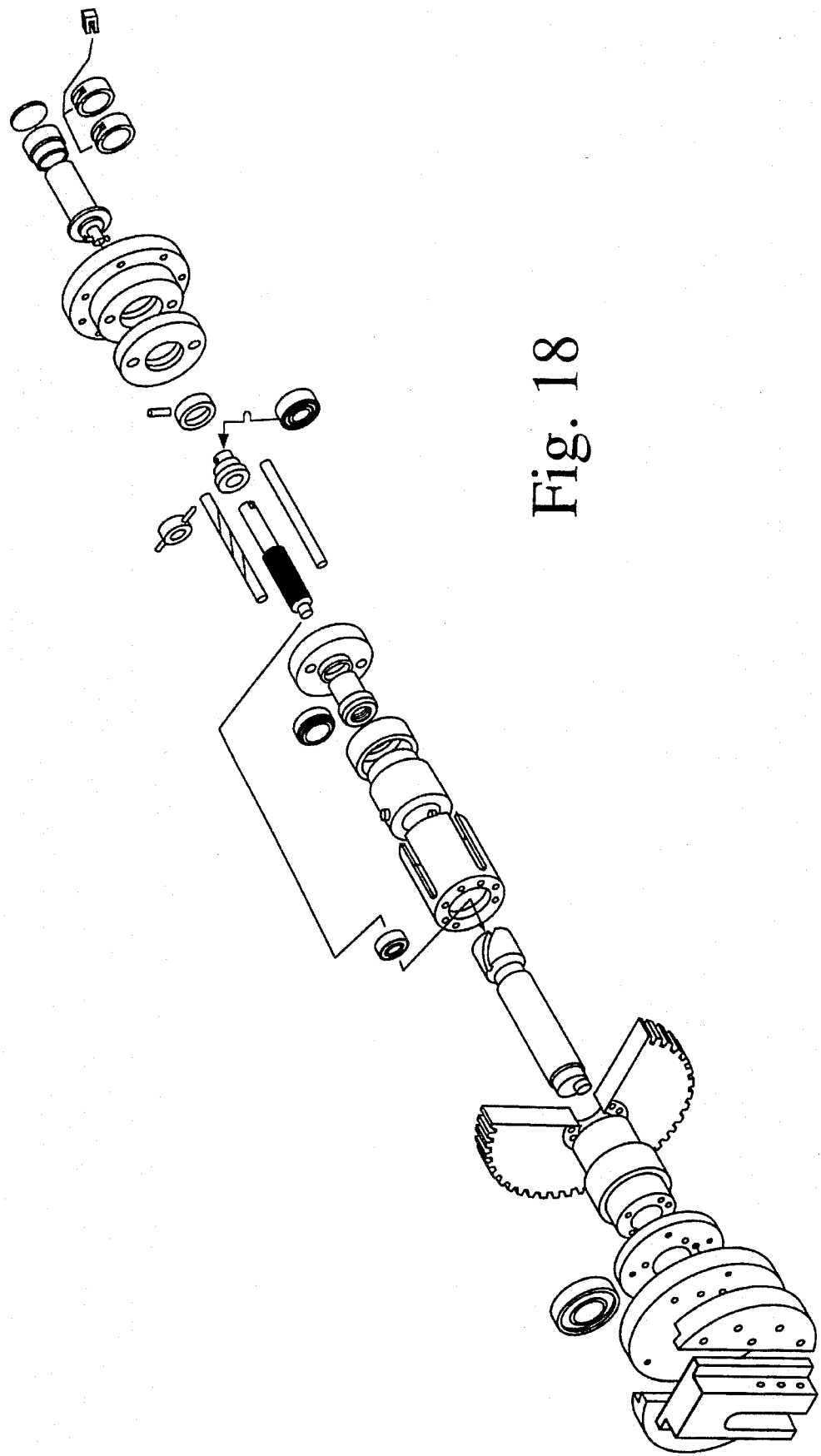

FIG. 18 is a second exploded view of the interior components of the preferred embodiment of the Cutting Tool.

Figure 19:
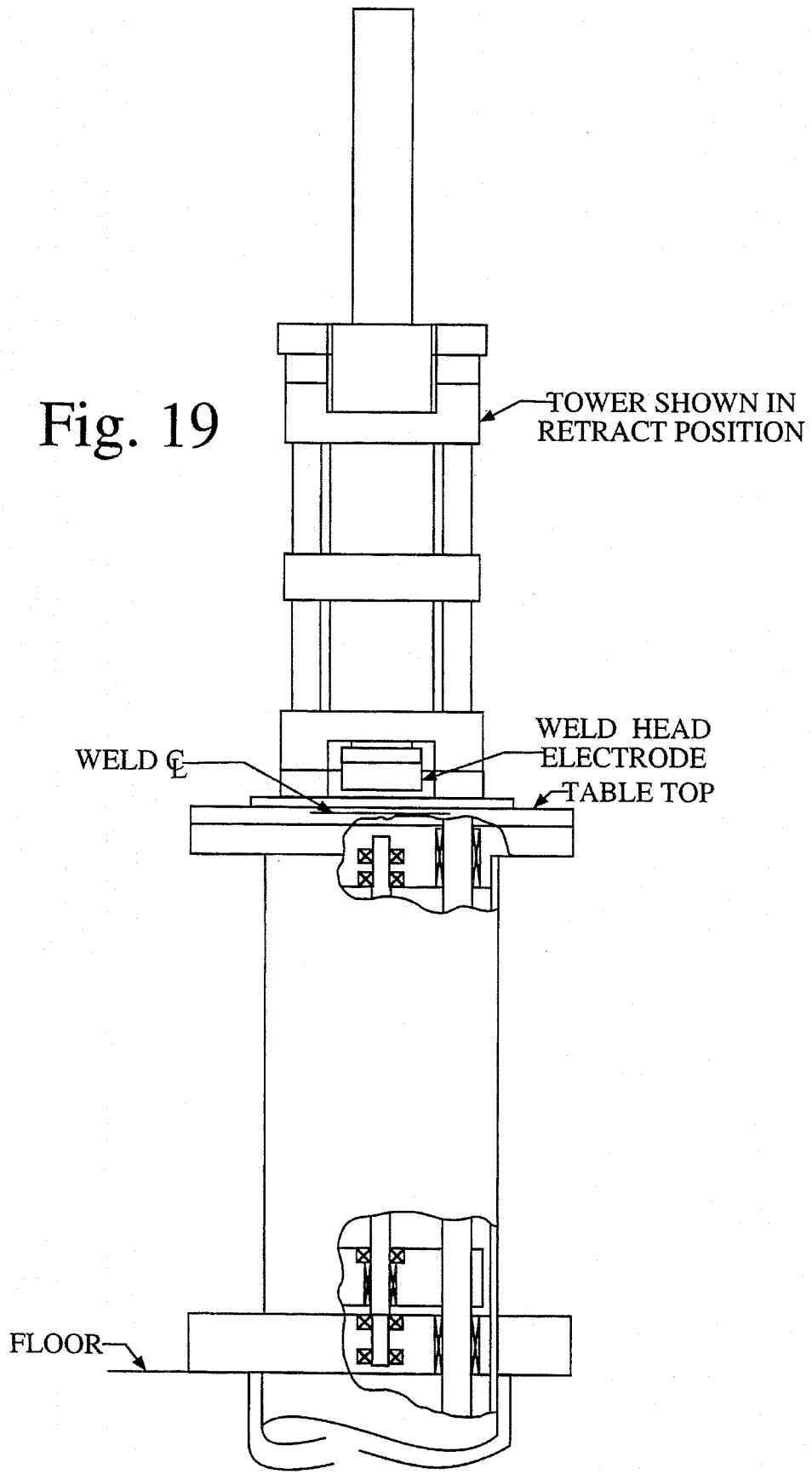
Figure 20C:
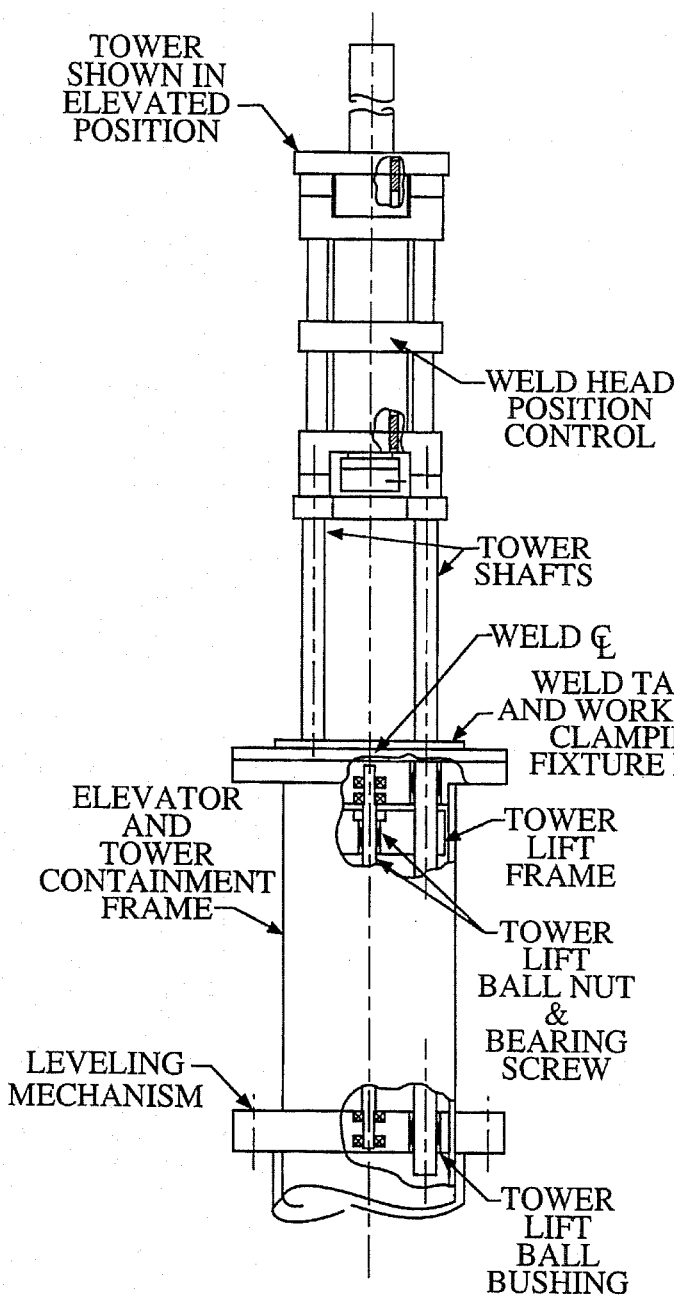
Figure 20D:
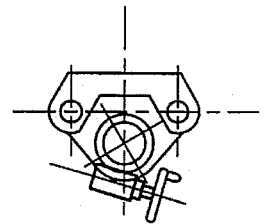
Figure 20E:
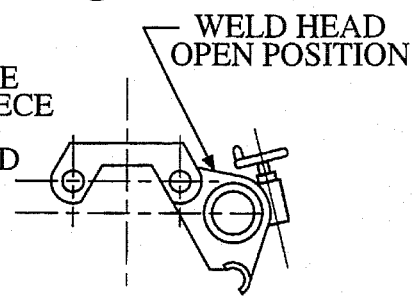
Figure 20F:
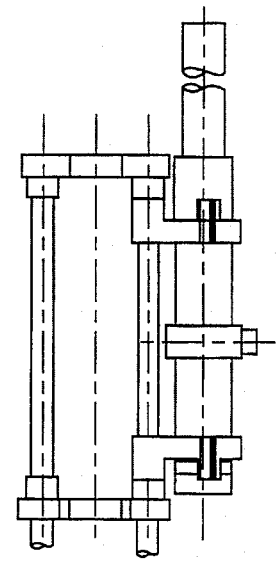

FIG. 19 is a schematic view of one of the preferred embodiments of the Welding Tool.

FIGS. 20a, 20b, 20c, 20d, 20e and 20f provide various depictions of the Welding Tool tower, which include elevator shafts, a floor mounting flange, a weld table, and the weld head in different positions.

FIG. 21 exhibits a section of the Welding Tool which is located just below the weld table top.

Figure 22:
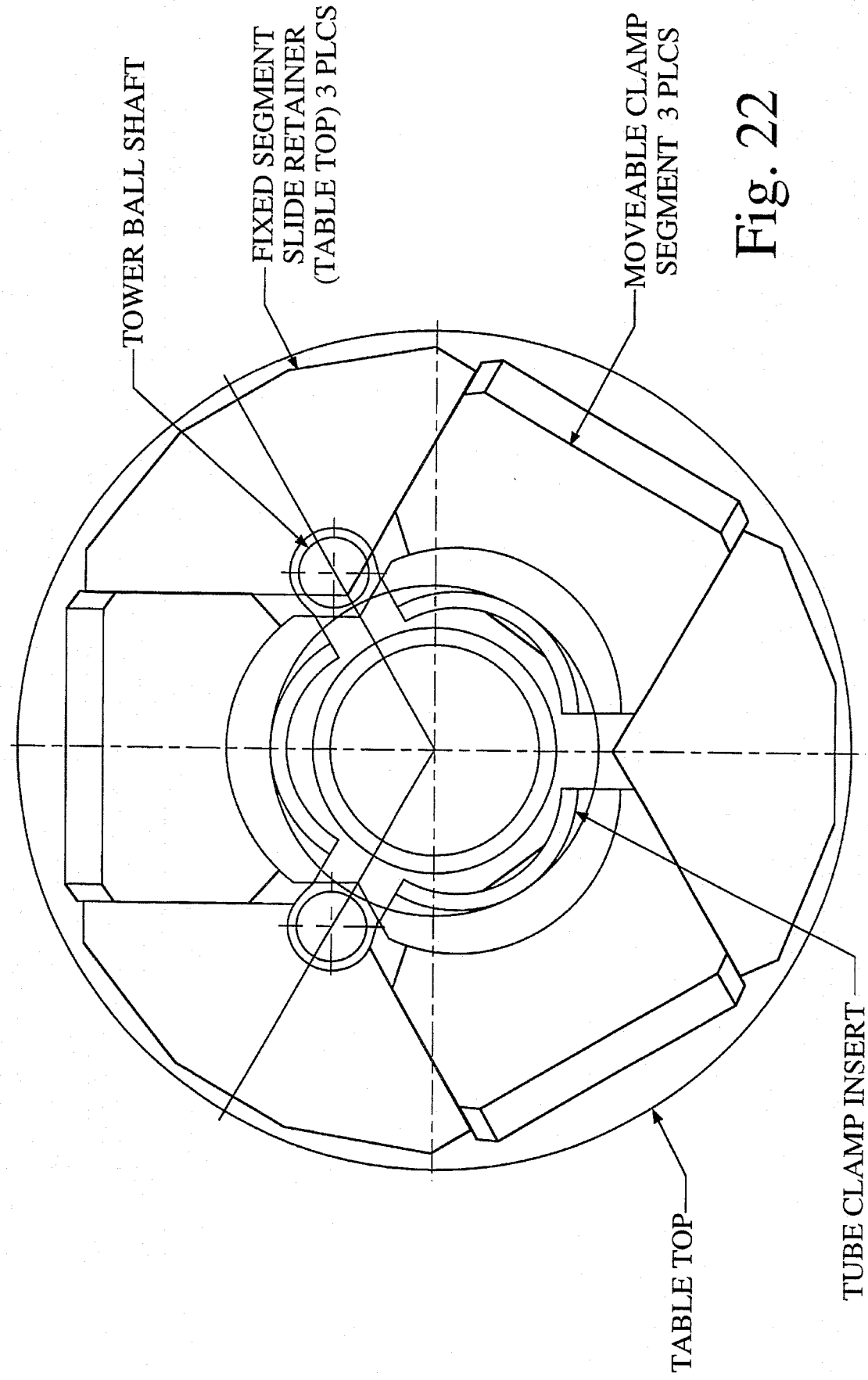

FIG. 22 is a plan view of the weld table top.

Figure 23:
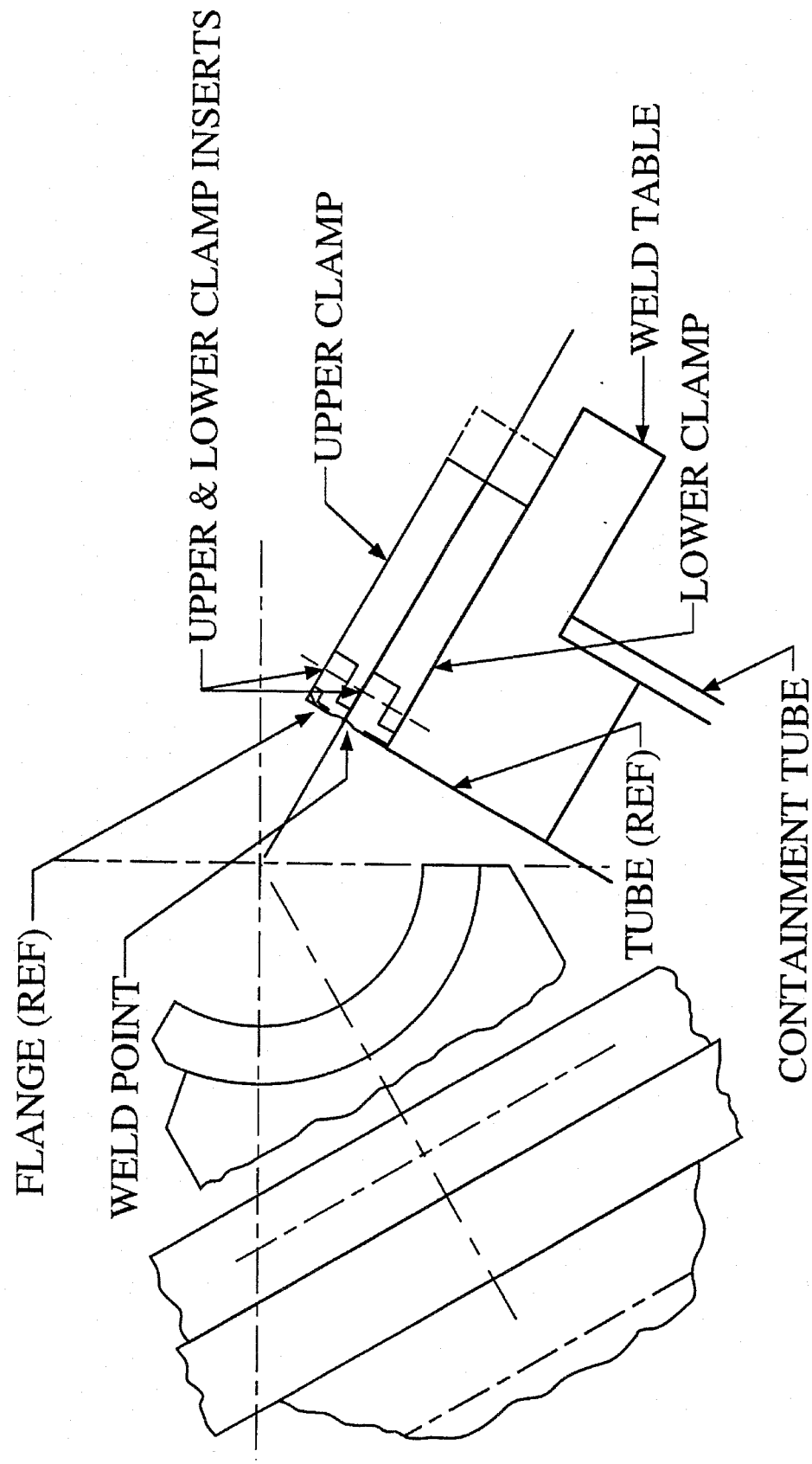

FIG. 23 shows the clamp mechanism of the Welding Tool in cross-section.

Figure 24:
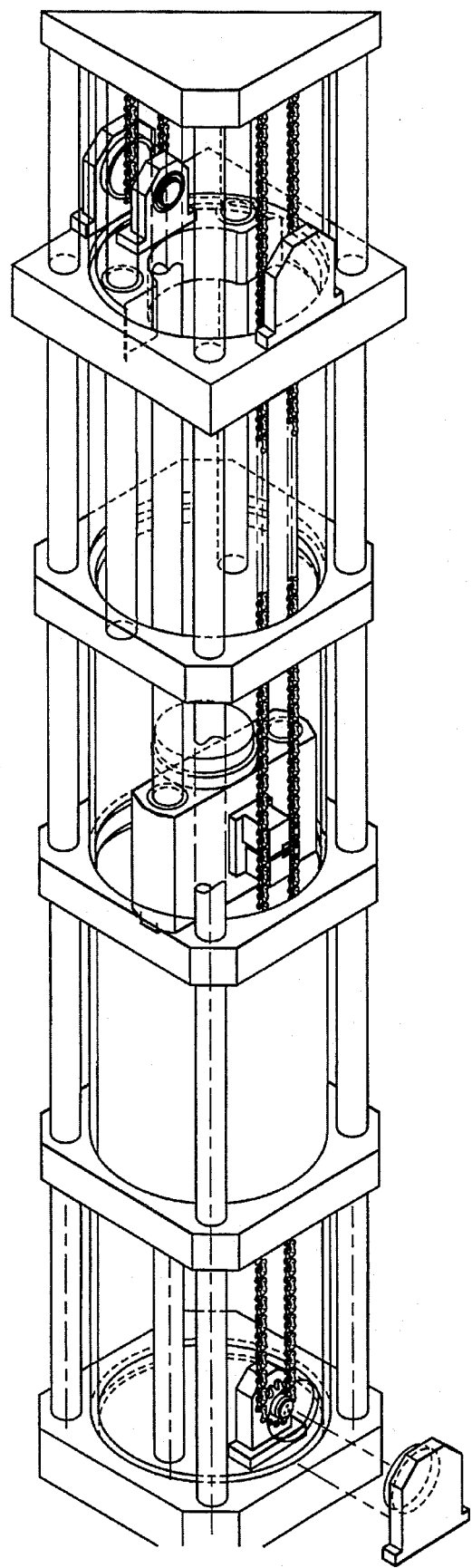

FIG. 24 is a schematic drawing of the entire Welding Tool tower.

Figure 25:
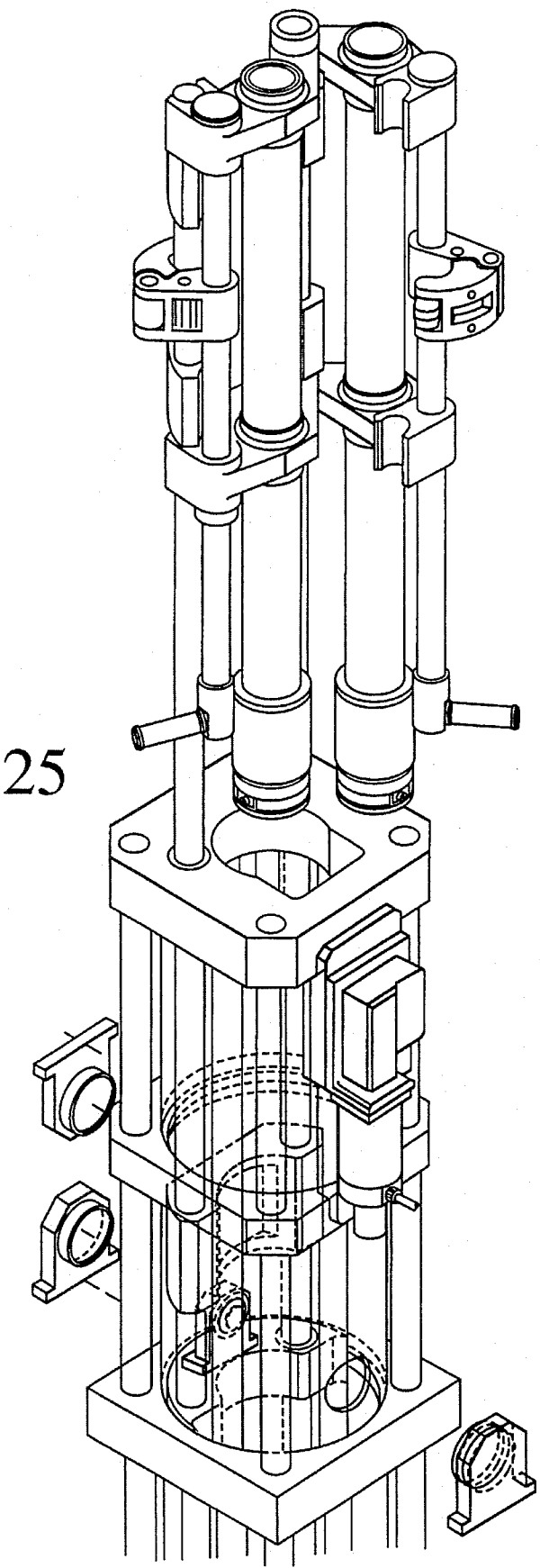

FIG. 25 provides details of one section of the schematic drawing shown in FIG. 24.

Figure 26:
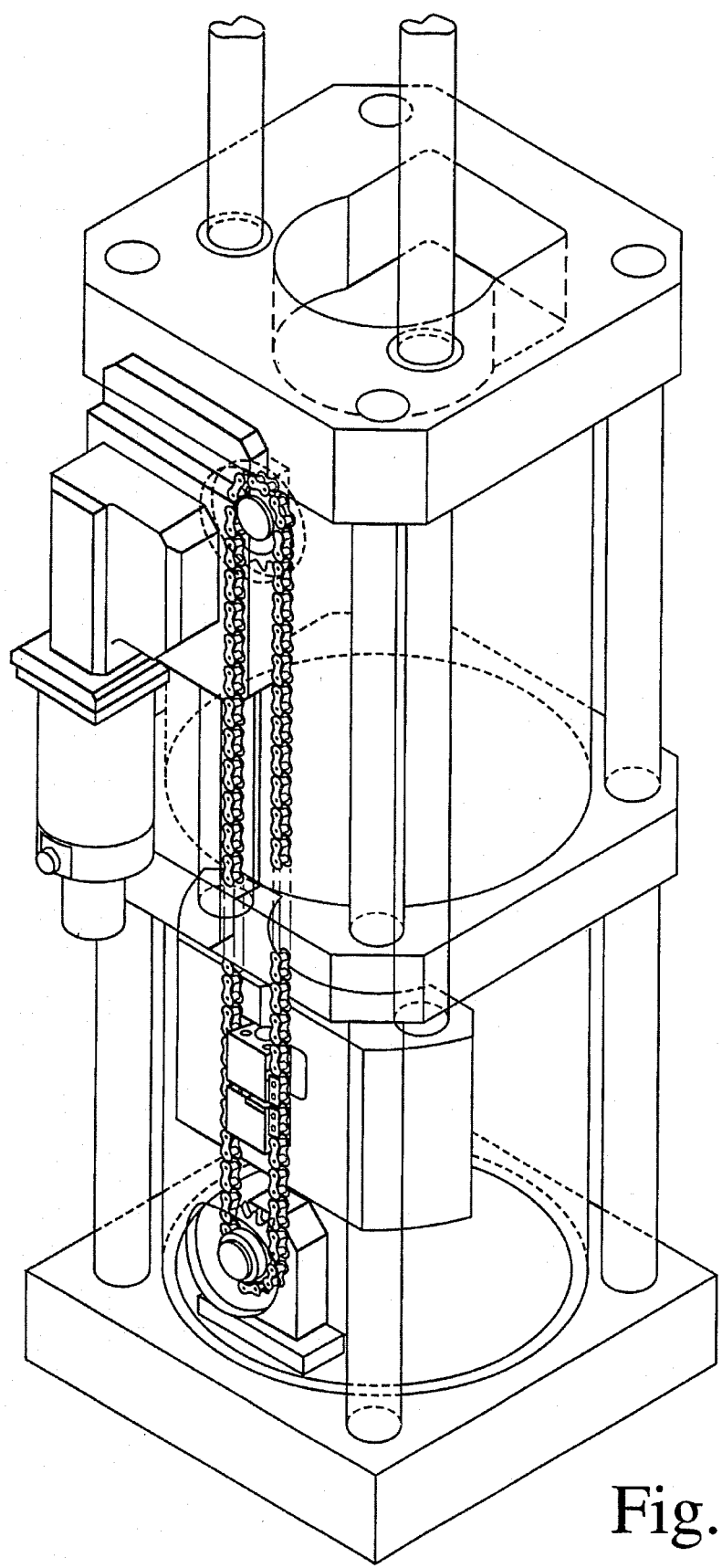

FIG. 26 provides additional details of a section of the schematic drawing shown in FIG. 24.

Figure 27:
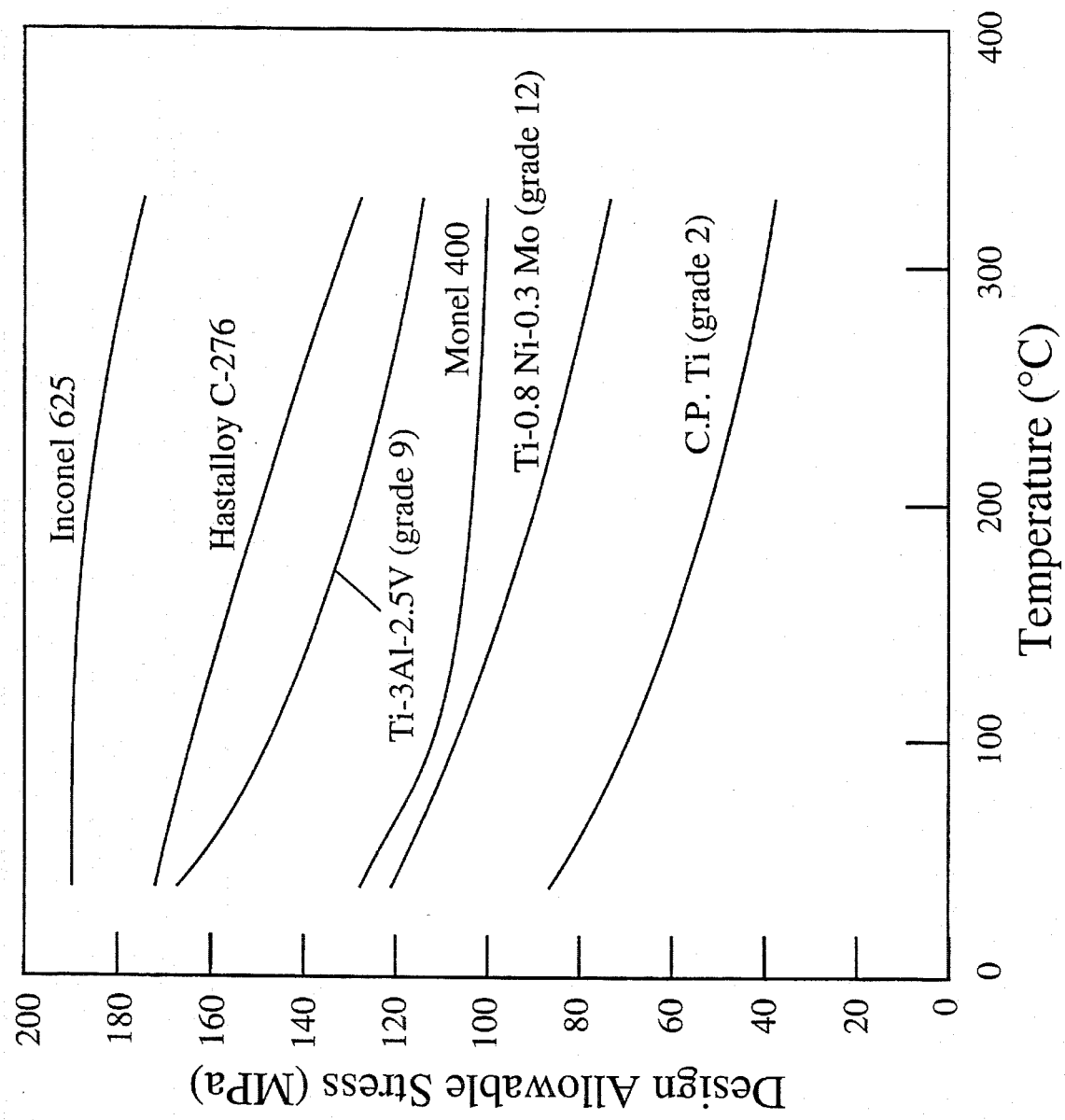

FIG. 27 is a chart which illustrates the design allowable stress of various alloys used in high temperature applications.

Figure 28:
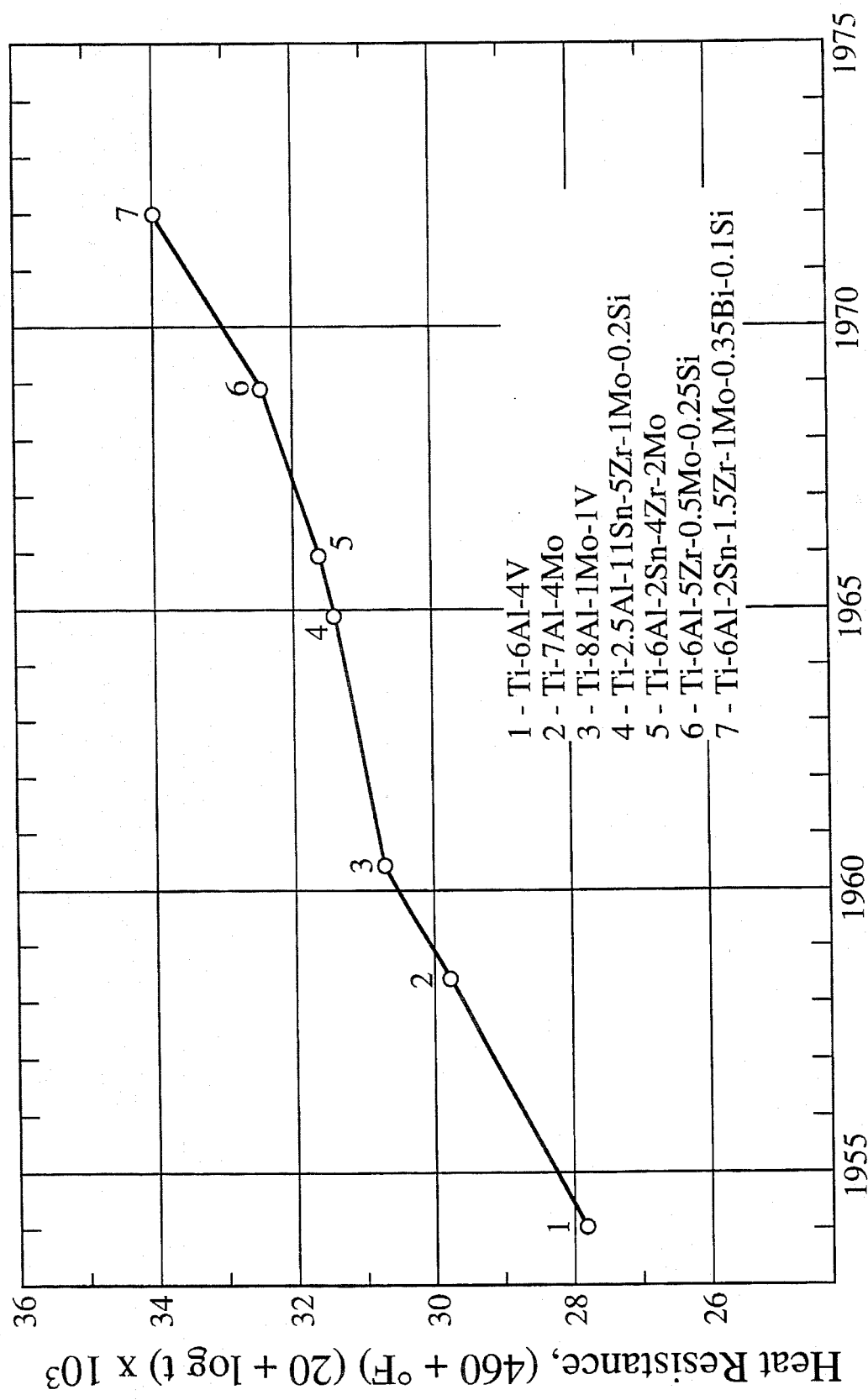

FIG. 28 is a diagram which illustrates the hisotry of the commercial introduction of heat resistant titanium alloys in the United States.

Figure 29:
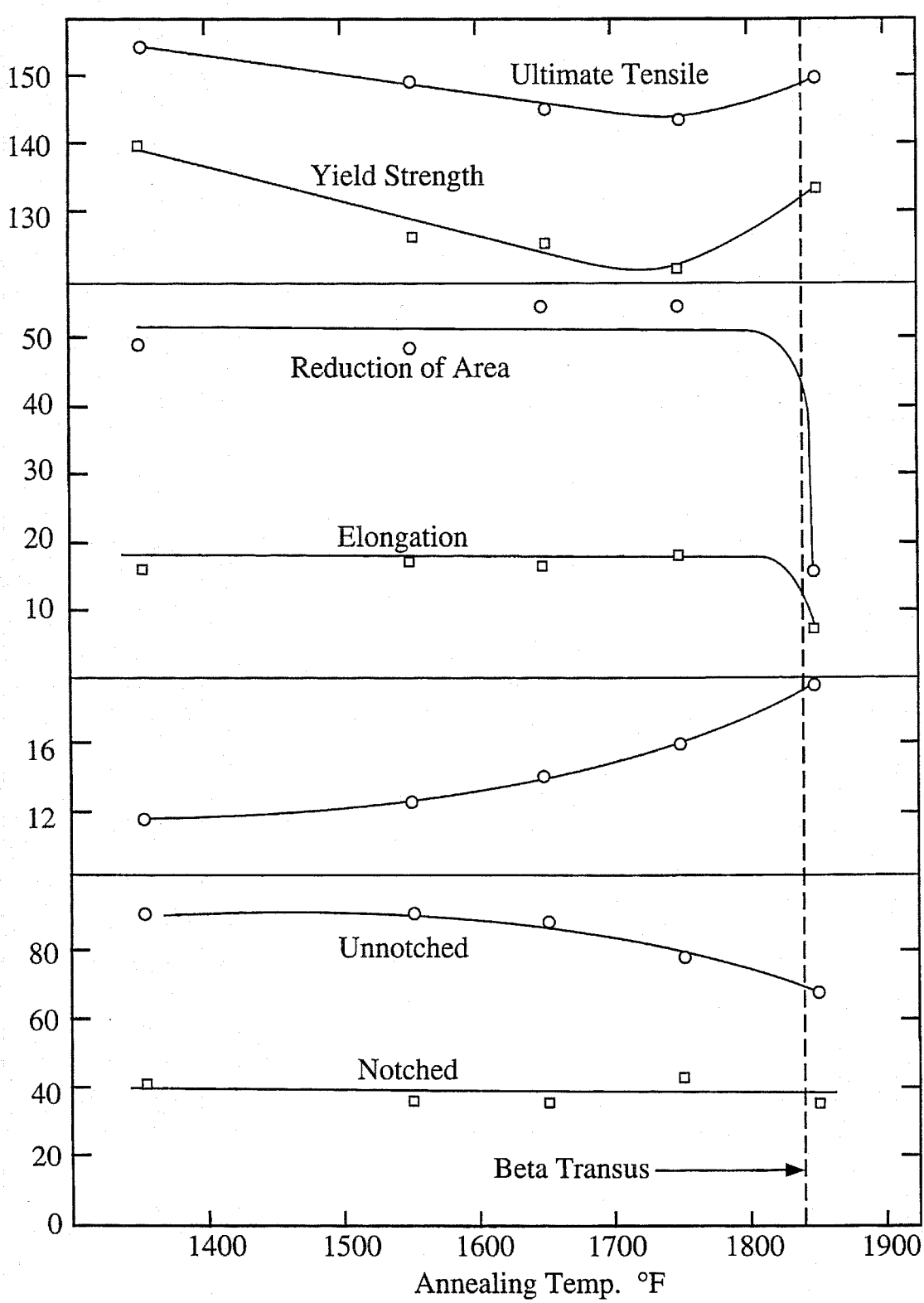

FIG. 29 depicts the various effects of annealing temperatures of an aerospace grade titanium alloy.

FIG. 30 is a chart that reveals the structural classes of titanium base alloys.

Figure 31:
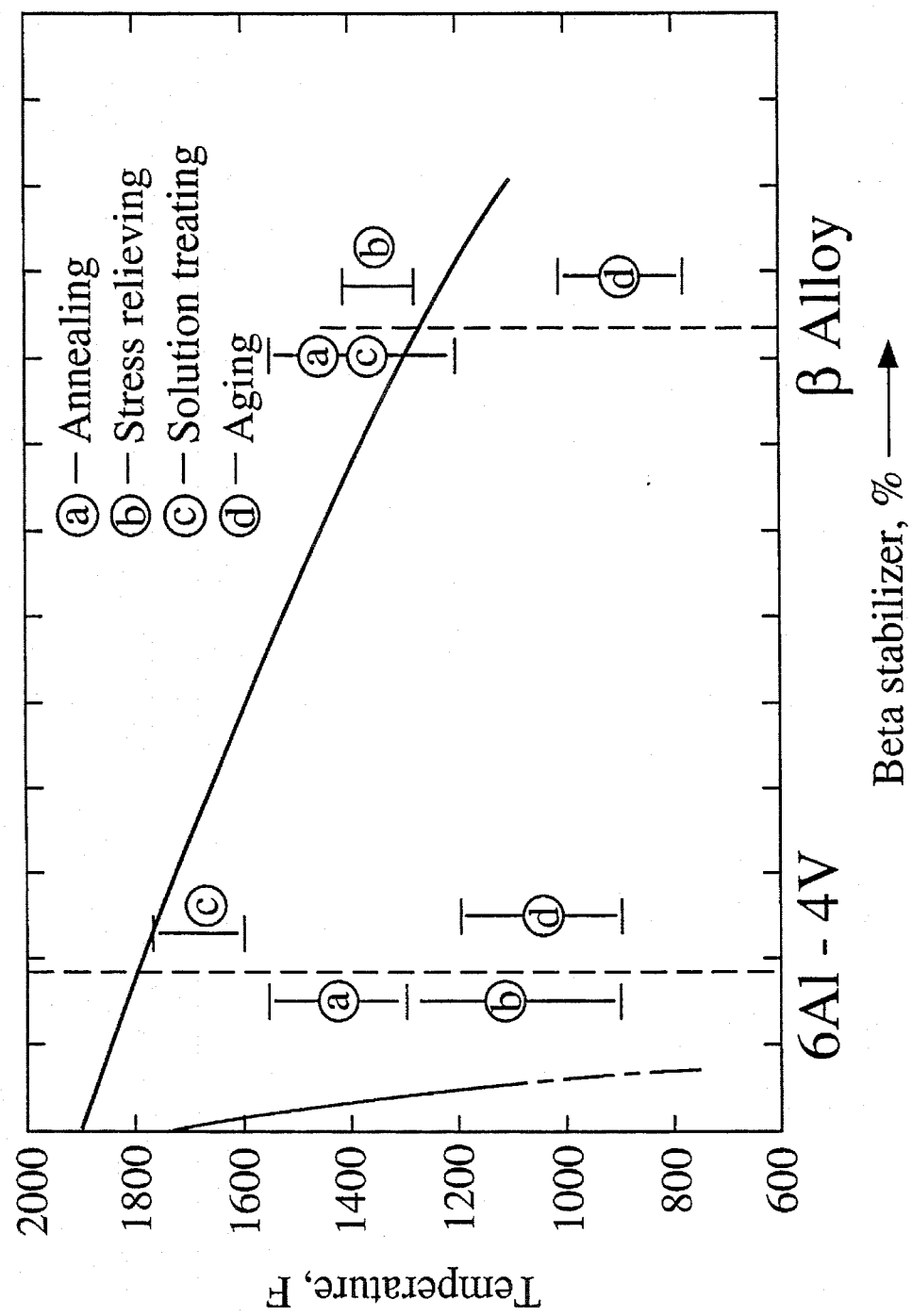

FIG. 31 is a diagram that provides typical heat treatments of alpha-beta and beta titanium alloys.

DETAILED DESCRIPTION OF A PREFERRED EMBODIMENT

THE SIZING TOOL

Figure 1:
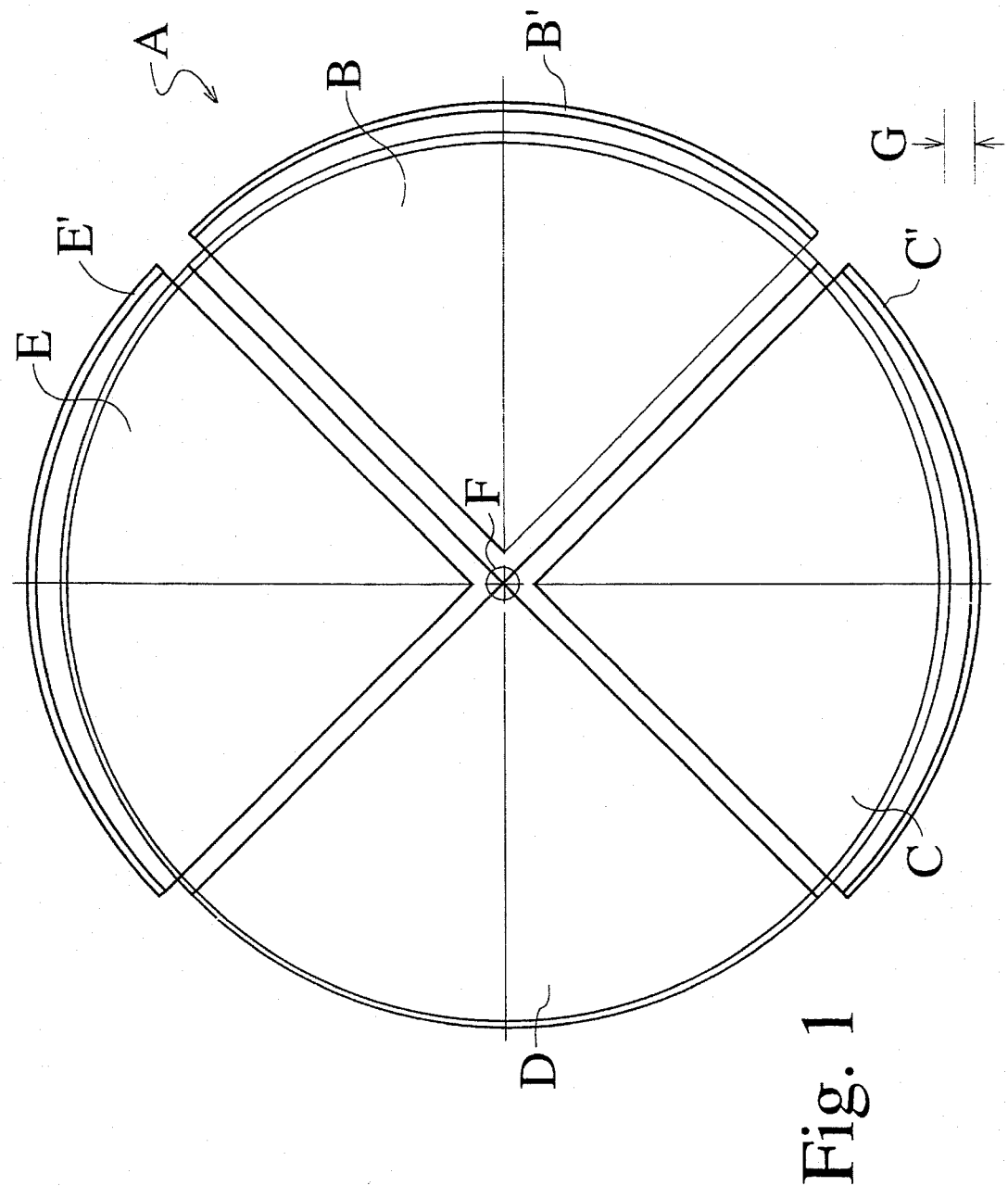
FIG. 1 is a front schematic view of a conventional non-rotating radial spreading device.
Figure 2A:
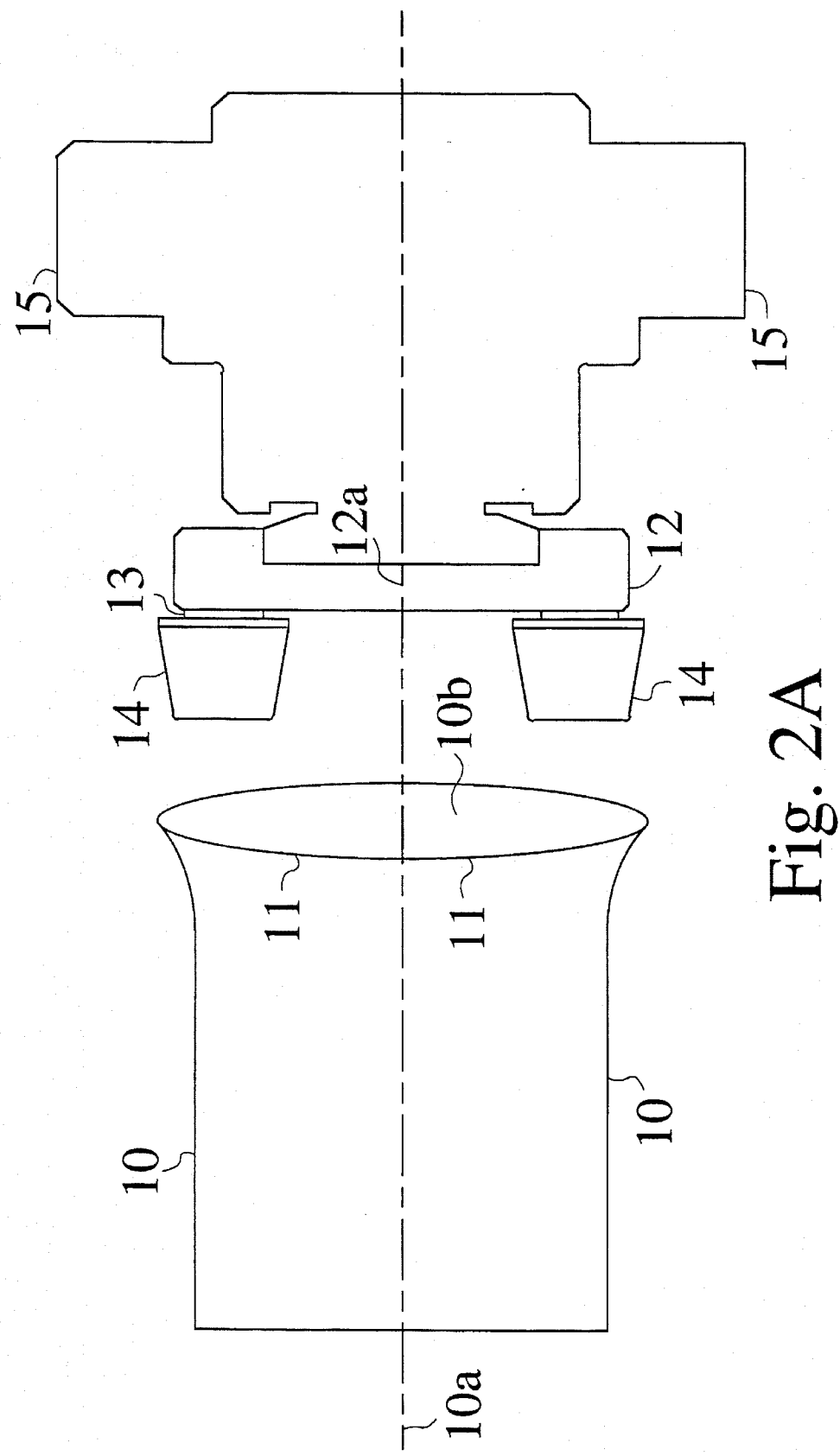
FIG. 2A is a side schematic view of the High-Precision Sizing Tool System which shows two rollers that have formed a precisely flared surface at the end of a cylindrical workpiece.

FIG. 1 depicts a conventional "pie-die" spreader which is described above in the background section. FIG. 2A presents a schematic illustration of a hollow cylindrical titanium, Inconel™, or hybrid stainless steel metal tube 10 and the Sizing Tool. The tube 10 has an axis of revolution 10a that extends through its central aperture 10b. The present invention is capable of forming either a flared or reduced surface 11 at the end of tube 10. In this specification, the term "flared" generally refers to a surface which opens out or is larger than some reference surface, such as the surface 11 shown in FIG. 2A at the end of tube 10. In contrast, the term "reduced" is generally employed to connote a constricted or diminished dimension.

The titanium used for many aerospace applications, such as specified by Boeing Inc. of Seattle Wash., for use with the tube 10 in the present invention, is typically a Grade II titanium alloy, which starts as sheet/strip stock in accordance with AMS and U.S. military specification standards MIL-T-9046, AB-1, (Ti-6Al-4V). The tensile properties of this titanium alloy for which the present invention is designed are presented below:

TABLE ONE

| Constituent | Grade II (Ti—6Al—4V) Titanium |
| --- | --- |
| Yield Strength (PSI) | 40,000 to 60,000 |
| Ultimate Strength (PSI) | 50,000 minimum |
| Elongation Percent | 20 minimum |

The acceptable chemical analysis of this titanium alloy by Boeing Inc. is shown below:

TABLE TWO

| Constituent | Grade II |
| --- | --- |
| Titanium | 99.2 percent minimum |
| Hydrogen | 0.006 percent (60 ppm) maximum |
| Oxygen | 0.14 percent (1400) maximum |
| Iron | 0.20 percent maximum |

One distinct feature of titanium alloys, such as that specified for applications by Boeing Inc., is their high degree of ductility, which proves to be challenging for fabricated tubing assemblies. The present invention is designed to extensively and precisely work harden these ductile alloys into a precise and permanent geometry which can then be welded into a larger aerospace structure.

FIG. 2A also depicts a mounting plate 12 connected to bearings 13 that each support a roller 14. Plate 12 has an axis of revolution 12a that extends through its center. Axis 12a is colinear with axis 10a that extends through the center of the workpiece 10. The mounting plate 12 and rollers 14 are held by a tool mount assembly 15, which may be viewed in greater detail in FIGS. 4 and 6. The tool mount assembly 15 may include either the Sizer Tool, or the Cutter Tool, which is described below. In the preferred embodiment of the invention, the workpiece 10 is stationary and the plate 12 and rollers revolve around axes 10a and 12a. In an alternative configuration, the workpiece rotates and the Sizing Tool remains stationary. While the preferred embodiment utilizes eight rollers 14, any number of rollers 14 may be utilized to match the needs presented by a particular workpiece 10.

While the typical workpiece 10 is a hollow tube of exotic aircraft metal such as titanium or stainless steel that resembles a right circular cylinder, any number of structural end shapes, including those having elliptical and oval cross-sections, may be formed using the present invention. The workpiece can be composed of any material which is susceptible to deformation under a gradual and repeated radial force.

Figure 2B:
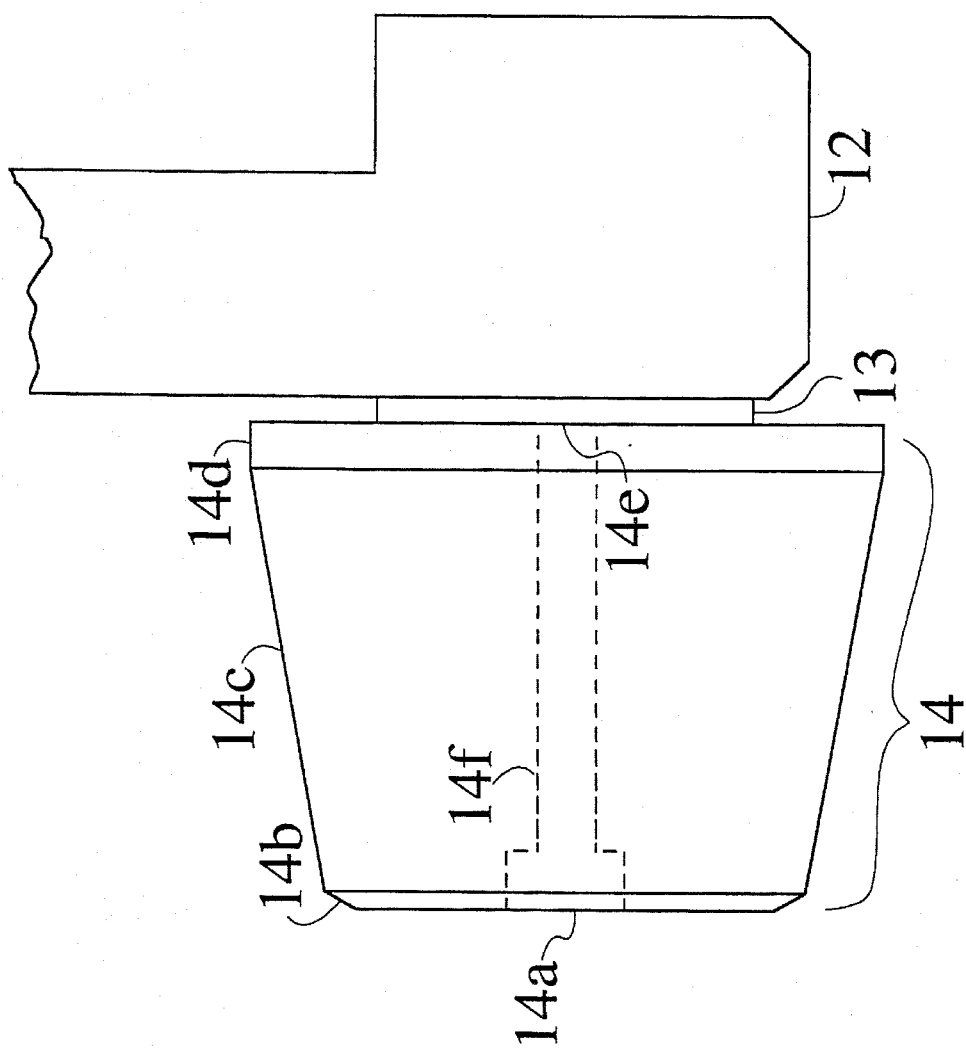
FIG. 2B is an enlarged side view of one of the rollers depicted in FIG. 1.

As best shown in FIG. 2B, each roller 14 includes a front surface 4a, a bevel 14b, a work surface 14c, a side flat surface 14d, and a back surface 14e. The work surface 14c of each roller 14 may be formed in a wide variety of profiles. In many of the multiple embodiments of the invention, the work surface 14c is a simple linear taper that is inclined ten to fifteen degrees to axes 10a and 12a. The work surface may also be curved to produce different flared or reduced surfaces on the workpiece 10. In the most preferred embodiment, the roller taper is ten degrees. A screw 14f runs through the center of each roller 14 to secure it to its respective bearing 13. A disc-shaped front plate (not shown) may be secured to one or more of the front faces 14a of the rollers 14 to provide added strength to the Sizing Tool. The preferred embodiment utilizes rollers having a diameter which insures that the edges between the beveled surfaces 14b and the work surfaces 14c almost touch. This configuration insures that the workpiece will experience the most gradual and gentle level of multiple reverse bending.

Figure 2C:
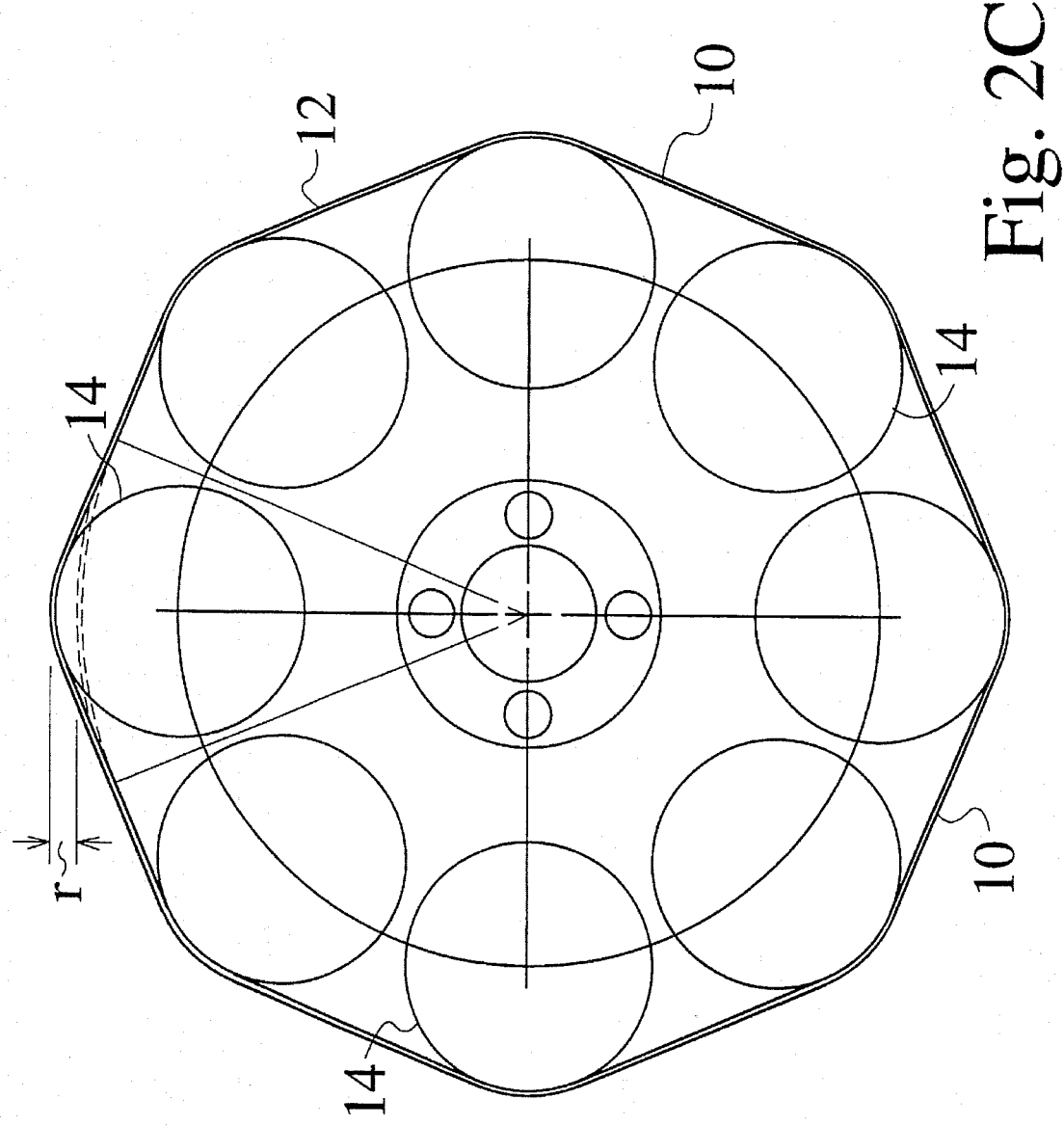
FIG. 2C is a front view of the preferred embodiment of the invention which illustrates the multiple forward and reverse bending method.
Figure 2H:
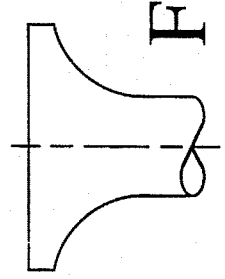
Figure 2I:
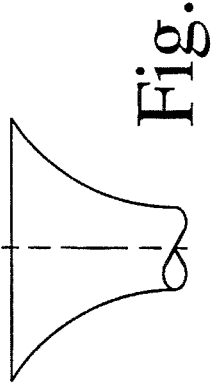
Figure 2J:
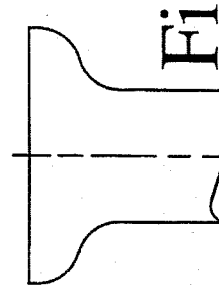
Figure 2K:
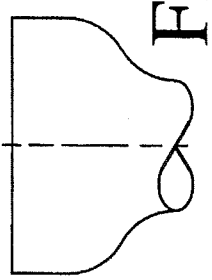

FIG. 2C provides a front view of the present invention which illustrates the novel multiple forward and reverse bending method. Each time each roller 14 makes one revolution around the inside of the workpiece 10, each spot on the workpiece undergoes a differential radial deflection that results from the combined outward and inward flexing caused by the rollers 14. Each roller 14 pushes out the tube 10 and creates an arc centered at the point which coincides within the longest extent of radial deflection. This repeated dynamic flexing is graphically delineated in FIG. 2C by the reference label "$\delta r$".

FIGS. 2D through 2K are side views of rollers that exhibit illustrative examples of the various work surfaces that may be utilized with the present invention.

FIG. 2L is a schematic diagram of one moving roller 14 impinging upon a workpiece 10. The illustration provided by FIG. 2L is based on a portion of the drawing supplied by FIG. 2C. As the roller 14 rotates in a clockwise direction, all the points along the inner circumference of the hollow cylinder 10 experience alternating forward (+) and reverse (−) bending. The rollers 14 alternately cause the tube wall 10 that is in contact with each roller to flex in opposite directions, while gently traversing the roller curvature.

FIG. 2M presents a side view of a sized titanium, Inconel™, or hybrid stainless steel cylinder 10. During the sizing operation, each roller 14 engages the tube 10 and imparts a gentle progressive flexuring of the tube end. These repeated forces cause the small crystals or fibers of metal at the end of the tube to pass their yield point. The repeated flexure forces enhance the ability of the metal fibers to resist the elastic forces that would naturally tend to force the tube back to its original shape. Once enough mechanical strength and stability is achieved through repeated flexure, the tube retains its new shape and is less likely to tear or crack along the area of the bend. Reference numerals 11a and 11c indicate the points of minimum and maximum deflection caused by the dynamic flexure action of the rollers 14. The point on the flared tube wall that experienced the minimum deflection, 11a, is the most mechanically stable area of the entire sized surface. This mechanical stability reduces the natural tendency of the tube to spring back to its original position. The very end of the flared portion of the tube, 11c, which experienced the most bending forces, is less stable and is more susceptible to the elastic "springback" forces inherent in the metal. Each crystal or fiber of metal along the flare from 11a to 11c is included within the region labeled 11b. Each small section of metal in this area 11b is progressively more stable than the one that preceded it. Each point on the flared end supports its neighbor toward the end of the flare, and preserves the mechanical stability of the entire shape.

FIG. 3 provides a front view of a roller plate 12 bearing eight cam rollers 14. This assembly is held together by a set of alternating screws and dowels 17.

FIG. 4 is a cross-sectional view of the tool mount assembly 15 that includes the plate 12 and rollers 14. A housing 18 encloses a retainer plate 20 and a rotor 22 that, in turn, extends into a drive shaft 24. The tool mount assembly 15 typically rotates the plate 12 and rollers 14 at fifty to two hundred revolutions per minute. The operational angular velocity of the plate 12 and rollers 14 is determined by the toughness or thickness of the workpiece. Each material may be machined using a preselected, appropriate speed. This advantage is not available when conventional static spreaders are employed.

FIGS. 5a, 5b, 5c, and 5d exhibit detailed views of the rollers 14 and roller plate 12. A stud 14g supports antifriction bearings (not shown) that, in turn, support the tapered roller 14. A retainer 14h and a screw 14f hold the roller 14 on plate 12.

FIG. 6 is a cross-sectional rendering of the motor assembly 16 which drives the tool mount assembly 15. A drive motor 26 turns a spur gear 28, which, in turn, drives a ring gear 30. A mounting flange 32 is enclosed within gear box housing 34 and side stiffening plate 36. Two ball shafts 38 on either side of the motor assembly 16 slide within ball bushings 40 that are supported by ball bushing mounts 42 and ball shaft mounts 44. The ball shafts 38 are enclosed by extensions 46. Ball shaft mounts 44 are attached to a base plate 48. Either the Sizer Fool or the Cutter Tool can be mounted on a motor mount side plate 50. FIG. 6 shows the roller plate 12 in its full thrust position for the sizing operation, which is delineated by reference numeral 52. The full thrust position for the cutter tool operation is marked by reference numeral 54. A tail stock 56 is mounted on the ball shaft 38. The ball shall 38 maintains concentricity with the tool spindle center-line (axis of revolution) 12a. The tail stock 56 holds the tube 10. Inserts 58 having various diameters (best seen in FIG. 7) can accommodate many different sizes of tubes 10.

FIG. 7 is a front cross-sectional view of the apparatus shown in FIG. 6.

FIG. 8 provides front and side views of a workpiece frame. The motor mount sliding plate 50 moves back and forth on ball bushing 40 and ball shaft 38. This motion permits the tool mount assembly 15 which includes the rollers 14 to move in and out of the workpiece 10. This motion is limited by adjustable stops, guides, and gauge blocks (not shown) which set the thrust positions for each tool and which provide precise positioning for sizing and cutting.

FIG. 9 includes several views of a tool advance mechanism. FIG. 9(a) portrays a thrust pivot frame 70 that supports a thrust mechanism 72 which includes a pivot hook 74 and a handle 76. The various handle positions are marked by reference numerals 76a through 76e which indicate the corresponding operational condition of the thrust mechanism for each position:

TABLE THREE

| Handle Position | Thrust Mechanism Operation |
| --- | --- |
| 76a | Idle |
| 76b | Initial contact |
| 76c | Initial thrust |
| 76d | Half thrust |
| 76e | Full thrust |

ADVANTAGES OF THE SIZING TOOL

The novel dynamic bending method utilized by the present invention produces results which are superior those achieved by conventional static spreader devices. The Sizing Tool is not only much faster than the older pie-die spreader, but does not require lubrication or cooling of any kind. By avoiding the lubricants that are generally used in conventional devices that form into a die or mold, the present invention eliminates the need to perform expensive and nettlesome clean-up operations of exotic metals. The invention claimed below may also be used to form an inward flare or can be used with an induction heating device to assist in the deformation of the hollow tube. Unlike the older static spreader devices, the Sizing Tool places a flared edge exactly where it is required. Older machines can only attempt to form a permanent flare, and unusable excess areas must then be trimmed from the tube. The present invention also affords an additional engineering advantage by allowing a technician to fabricate a flare on a relatively short workpiece. Previous machines require so much force to impose a deformation on a hollow tube that a short workpiece would be unable to withstand the very large forces required to create the flare. Since the Sizing Tool applies the deflection energy via the dynamic sizing method described above, much lower forces are needed and shorter workpieces are readily sized. Centering the workpiece is also much easier to accomplish using the present invention, as compared to the pie-die spreader.

THE CUTTING TOOL

FIG. 17 reveals an exploded perspective view of a Cutting Tool Bit Drive Assembly 100. A tool bit holder subassembly 101 includes a body 101A and a bit holder 101B which translates inside a slot 101C and holds a bit 101D. The bit holder 101B has a rear cam roller slot 101E formed in its rear face 101F. The entire tool bit holder subassembly 101 is held in place by a pair of tool bit holder clamp guides 102. The guides 102 are held by machine screws against a tool bit guide clamp mount 104A and a machine head mounting plate 104B, which is mechanically coupled to a cam bearing 103. The mounting plate 104B is coupled to a rotor 105, which includes a forward portion 105A, a step portion 105B, and a rear portion 105C. The elements described above between and including the tool bit holder 101 back through and including the mounting plate 104B are specific to either the Sizing or the Cutting Tool. All the elements behind the mounting plate 104B starting with rotor 105 are common to both the Sizing and the Cutting Tools. The rotor 105 is attached to the center of a rotor ring gear 106 that is driven by a smaller pinion gear (not shown in FIG. 17). The pinion gear, in turn, is powered by a main motor which provides rotary energy to the Cutting Tool Bit Advance Assembly 100. In an alternative embodiment, the ring gear 106 may be replaced by a belt or some other suitable traveling or rotating energy transfer device.

A critical transmission means which controls the motion of the Cutting Tool is a tool bit advance cam shaft 107. This shaft 107 has a central portion 107A, an eccentric cam roller 107B mounted on a forward-facing flange 107C, and terminates at the end opposite flange 107C in a spiral channel cup 107D. This cup 107D includes at least one spiral guidance channel 107E. In the preferred embodiment of the invention, the spiral channels 107E are formed at an angle of approximately thirty degrees from the central axis of shaft 107. The shaft 107 is received by another critical transmission means in the Cutting Tool, a cam pin housing longitudinal guide cup 108. This cup has a cylindrical body portion 108, a front face 108B that is oriented toward shaft 107, and a hole 108C that leads to a central chamber 108D. The end of the cup 108 which lies at the opposite end from the front face 108B includes at least one straight longitudinal guidance slot 108E. The slots 108E are formed at the rear end of the cup 108 which defines a rear opening 108F that receives a cam actuating housing 109. This housing 109 includes a body portion 109A, a front face 109B, a central chamber 109C, a rear flange 109D, and a cam pin hole 109E. A cam pin 110 is seated in cam pin hole 109E. The cam pin 110 has an upper portion 110A, a middle portion 110B that extends through housing 109, and a lower portion 110C that extends into the central chamber 109C enveloped by the housing 109. A rear fitting 110D fits over the flange portion 109D of housing 109. A lead screw bearing 111 is coupled to a lead screw nut 112 and a traveling thrust bearing 113, that, in turn, are received by a control rod base 114 which includes a front flange 114A and a hole 114B. A lead screw shaft 115 fits through the rod base 114 and includes a rear portion 115A that has a slotted end 115B. The shaft 115 also includes a threaded portion 115C and a forward reduced portion 115D. A pair of longitudinal position control rods 116 are located parallel to shaft 115 and are received by holes in a ring bearing retainer 118 that is attached to a shaft bearing retainer 117. A bearing lock ring 119 is coupled to a fixed thrust bearing 120 by a lock ring pin 121. A motor mount 122 having a front face 122A and a flange portion 122B surrounds an advance mechanism drive motor shaft 123 that includes a shaft body 123A, a front flange 123B, a forward projection 123C, and a pin 123D. The shaft 123 is coupled to an adjustable optical sensor 124 which provides longitudinal distance control. The motion of the shaft 123 is governed by an optical speed control 125 which includes an adjustable mount 126, an actuator 127, and an encoder board 128.

The Cutting Tool is rotated by the action of the pinion gear, which engages ring gear 106. The advance cam shaft 107 provides the radial motion which provides precise control of the cutting action of the tool bit 101D. The cam roller 107A passes through the center of the ring gear 106, rotor 105, mounting plate 104B, clamp mount 104A, and bearing 103 and is engaged by slot 101E. The circular movement of cam roller 107A at the end of shaft 107 forces the bit holder 101B to ride up and down in slot 101C. After the Cutting Tool has been moved inside a tubular workpiece, the up and down radial motion of the holder 101B in slot 101C forces the bit 101D into the interior surface of the metal tube which is to be cut. The shaft 107, which moves the bit holder 101B, is rotated by the twisting motion of the spiral channel cup 107D. The spiral guidance channels 107E are designed to receive the lower portion 110C of cam pin 110, which is held by cam actuating housing 109. When housing 109 is moved toward the workpiece, it slides forward but does not rotate, since cam pin 110 is constrained to move along a straight line of travel by longitudinal slot 108E in guide cup 108. Since the cam pin 110 can not rotate, the lower portion of the cam pin 110C that extends into spiral channel 107E forces shaft 107 to rotate. The spiral channels 107E act as a transmission which converts the back-and-forth translation motion of the housing 109 and the cam pin 110 that it holds into precise rotational motion that governs the radial action of the cutting bit against the tubular workpiece.

FIG. 27 is a chart which illustrates the design allowable stress of various specialty alloys used in high temperature applications.

FIG. 28 is a diagram which illustrates the history of the commercial introduction of heat resistant titanium alloys in the United States.

FIG. 29 depicts the various effects of annealing temperatures of an aerospace grade titanium alloy.

FIG. 30 is a chart that reveals the structural classes of titanium base alloys.

FIG. 31 is a diagram that provides typical heat treatments of alpha-beta and beta titanium alloys.

The High-Precision Sizing, Cutting, and Welding Tool System for Specialty Aerospace Alloys disclosed and claimed in this patent application constitutes a major step forward in the machine tool art and will provide a valuable tool for designers and manufacturers of aircraft and aerospace vehicles.

CONCLUSION

Although the present invention has been described in detail with reference to a particular preferred embodiment, persons possessing ordinary skill in the art to which this invention pertains will appreciate that various modifications and enhancements may be made without departing from the spirit and scope, of the claims that follow. The various materials that have been disclosed above are intended to educate the reader about one preferred embodiment, and are not intended to constrain the limits of the invention or the scope of the claims. Although the preferred embodiments have been described with particular emphasis on titanium alloys, Inconel and stainless steel, the present invention may be beneficially implemented with other similar materials. The List of Reference Numerals which follows is intended to provide the reader with a convenient means of identifying elements of the invention in the specification and drawings. This list is not intended to delineate or narrow the scope of the claims.

LIST OF REFERENCE NUMERALS

FIG. 1

| | |
|---|---|
| A | Conventional pie-die spreader tool |
| B, C, D, E | Spreader tool sections |
| B', A', D', E' | Positions of displaced sections |
| F | Center |
| G | Radial displacement of sections |

FIGS. 2A, 2B, & 2C

| | |
|---|---|
| 10 | Cylinder |
| 10a | Axis of revolution of cylinder |
| 10b | Central aperture |
| 11 | Flared end of cylinder |
| 12 | Plate |
| 12a | Tool spindle center-line (Axis of revolution) |
| 13 | Bearing |
| 14 | Roller |
| 14a | Front surface |
| 4b | Bevel |

LIST OF REFERENCE NUMERALS

| | |
|---|---|
| 14c | Work surface |
| 14d | Side flat surface |
| 14e | Back surface |
| 14f | Screw |
| 15 | Tool Mount Assembly |
| 16 | Motor assembly |
| δr | Radial bending |
| FIGS. 3 & 4 | |
| 17 | Alternate screw & dowel |
| 18 | Housing |
| 20 | Retainer plate |
| 22 | Rotor |
| 24 | Shaft |
| FIG. 5 | |
| 14g | Stud |
| 14h | Retainer |
| FIGS. 6 & 7 | |
| 26 | Drive motor |
| 28 | Spur gear |
| 30 | Ring gear |
| 32 | Mounting flange |
| 34 | Gear box housing |
| 36 | Side stiffening plate |
| 38 | Ball shaft |
| 40 | Ball bushing |
| 42 | Ball bushing mount |
| 44 | Ball shaft mount |
| 46 | Extension for tail stock support |
| 48 | Base plate |
| 50 | Motor mount slide plate |
| 52 | Roller full thrust position |
| 54 | Cutter full thrust position |
| FIG. 8 | |
| 56 | Workpiece frame |
| 58 | Inserts |
| 60 | Hinge |
| 62 | Hinge motion limiter |
| 64 | Lever |
| 66 | Latch |
| 68 | Ball shaft |
| FIG. 9 | |
| 70 | Thrust pivot frame |
| 72 | Thrust mechanism |
| 74 | Thrust pivot hook |
| 76 | Handle |
| Handle Positions: | |
| 76a | Idle |
| 76b | Initial contact |
| 76c | Initial thrust |
| 76d | Half thrust |
| 76e | Full thrust |
| FIG. 17 | |
| 100 | Cutting Tool Drive Assembly |
| 101 | Tool bit holder subassembly |
| 101A | Body |
| 101B | Bit holder |
| 101C | Slot |
| 101D | Bit |
| 101E | Rear cam roller slot |
| 102 | Tool bit holder guide clamp |
| 103 | Cam bearing |
| 104A | Tool bit guide clamp mount |
| 104B | Machine head mounting plate |
| 105 | Rotor |
| 105A | Forward portion of rotor |
| 105B | Step portion of rotor |
| 106 | Rotor ring gear |
| 107 | Cutter advance cam shaft |
| 107A | Central portion of shaft |
| 107B | Cutter advance eccentric cam roller |
| 107C | Cam roller flange |

LIST OF REFERENCE NUMERALS

| | |
|---|---|
| 107D | Spiral channel cup on advance cam shaft |
| 107E | Spiral guidance channel |
| 108 | Cam pin housing longitudinal guide cup |
| 108A | Body portion of guide cup |
| 108B | Front face |
| 108C | Front hole |
| 108D | Central chamber |
| 108E | Straight longitudinal guidance slot |
| 108F | Rear hole |
| 109 | Cam actuating housing |
| 109A | Body of cam actuating housing |
| 109B | Front face |
| 109C | Central chamber of cam actuating housing |
| 109D | Rear flange |
| 109E | Cam pin hole |
| 110 | Cam pin |
| 110A | Upper portion of cam pin |
| 110B | Middle portion of cam pin |
| 110C | Lower portion of cam pin |
| 110D | Rear fitting |
| 111 | Lead screw bearing |
| 112 | Lead screw nut |
| 113 | Traveling thrust bearing |
| 114 | Control rod base |
| 114A | Front flange of control rod base |
| 114B | Hole in control rod base |
| 115 | Lead screw shaft |
| 115A | Rear portion of shaft |
| 115B | Slotted end of shaft |
| 115C | Threaded portion of shaft |
| 115D | Forward reduced portion of shaft |
| 116 | Longitudinal position control rod |
| 117 | Shaft bearing retainer |
| 118 | Ring bearing retainer |
| 119 | Bearing lock ring |
| 120 | Fixed thrust bearing |
| 121 | Lock ring pin |
| 122 | Motor mount |
| 123 | Cutter advance mechanism drive motor shaft |
| 123A | Body portion |
| 123B | Flange |
| 123C | Projection |
| 123D | Pin |
| 124 | Adjustable optical sensor for longitudinal distance control |
| 125 | Optical speed control |
| 126 | Optical sensor adjustable mount |
| 127 | Optical sensor actuator |
| 128 | Encoder board |

What is claimed is:

1. A method of dynamic sizing for applying alternating tension and compression forces to decrease the ductility of an end portion of a hollow metal tube (10) through a progressive work-hardening process to permanently and exactly deform said hollow metal tube (10); said hollow metal tubes (10) each having an axis of revolution (10a) and having a central aperture (10b) comprising the steps of:

engaging a plurality of movable tapered revolving rollers (14) into contact with said hollow metal tube (10) by moving said plurality of movable tapered revolving rollers (14) in a direction which is generally parallel to the longitudinal axis of said hollow metal tube (10);

said plurality of rollers (14) being mounted on a plate (12); said plate (12) having an axis of revolution (12a) that is generally colinear with said axis of revolution (10a) of said hollow metal tube (10);

said plurality of rollers (14) each extending away from said plate (12) generally parallel to said axis of revolution (12a) of said plate (12);

repeatedly stretching said hollow metal tube (10) with gentle and progressive flexuring action by alternately thrusting said hollow metal tube (10) radially outward with said plurality of movable tapered revolving rollers (14) and allowing said hollow metal tube (10) to flex radially inward until said end portion of said hollow metal tube (10) is worked to the extent that it is work hardened to prevent springback;

removing said plurality of movable tapered revolving rollers (14) from contact with said hollow metal tube (10) after a desired permanent deflection of said hollow metal tube (10) is achieved and joining two of said abutted hollow metal tubes (10).

2. A method as recited in claim 1, in which each of said plurality of rollers (14) has a tapered work surface (14c) which is not generally parallel to said axes of revolution (10a and 12a).

3. A method as recited in claim 1, in which each of said plurality of rollers (14) is mounted on said plate (12) on a bearing (13) which enables each of said plurality of rollers (14) to revolve on its bearing (13) when said hollow metal tube (10) is engaged.

4. A method as recited in claim 1, in which said plurality of rollers (14) are moved back and forth along said axis of revolution (10a) of said hollow metal tube to engage said hollow metal tube (10) while said hollow metal tube (10) is held in a fixed position.

5. A method as recited in claim 1, in which said plurality of rollers (14) remains in a fixed position while said hollow metal tube (10) is moved back and forth along said axis of revolution (12a) of said plate (12).

* * * * *